United States Patent
Park et al.

(10) Patent No.: US 10,764,213 B2
(45) Date of Patent: Sep. 1, 2020

(54) SWITCHING FABRIC LOOP PREVENTION SYSTEM

(71) Applicant: Dell Products L.P., Round Rock, TX (US)

(72) Inventors: Charles Chul Hyun Park, San Jose, CA (US); Balaji Rajagopalan, Sunnyvale, CA (US); Joseph LaSalle White, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 22 days.

(21) Appl. No.: 16/265,235

(22) Filed: Feb. 1, 2019

(65) Prior Publication Data
US 2020/0252351 A1   Aug. 6, 2020

(51) Int. Cl.
| | |
|---|---|
| H04L 12/939 | (2013.01) |
| H04L 12/933 | (2013.01) |
| H04L 12/803 | (2013.01) |
| H04L 29/06 | (2006.01) |
| H04L 12/713 | (2013.01) |

(52) U.S. Cl.
CPC .......... *H04L 49/552* (2013.01); *H04L 47/125* (2013.01); *H04L 49/101* (2013.01); *H04L 45/586* (2013.01); *H04L 63/101* (2013.01)

(58) Field of Classification Search
CPC ... H04L 49/552; H04L 49/101; H04L 47/125; H04L 63/101; H04L 45/586
See application file for complete search history.

(56) References Cited

U.S. PATENT DOCUMENTS

| | | | | |
|---|---|---|---|---|
| 2010/0202346 A1* | 8/2010 | Sitzes | .................. | H04W 84/18 370/328 |
| 2014/0086255 A1* | 3/2014 | Gooch | .................... | H04L 47/17 370/401 |
| 2014/0185624 A1* | 7/2014 | Mueller | .................. | H04L 45/48 370/401 |

(Continued)

OTHER PUBLICATIONS

"Loop Detection—Without STP—Lindsay Hill: Loop Detection—Without STP," May 20, 2013, 6 Pages, Filed in a Blog by Lindsay Hill, https://lkhill.com/loop-detection-without-stp/.

(Continued)

*Primary Examiner* — Michael A Keller
(74) *Attorney, Agent, or Firm* — Haynes and Boone, LLP

(57) ABSTRACT

A switching fabric loop prevention system includes first slave switch devices in a switching fabric that each automatically determine a first slave switch device role for themselves based on first directly connected device identification information received from a first directly connected device, and second slave switch devices in the switching fabric that each automatically determine a second slave switch device role for themselves based on second directly connected device identification information received from a second directly connected device. A master switch device in the switching fabric then configures each of the first slave switch devices having the first slave switch device role to prevent first type communications that have been received from one of the second slave switch devices having the second slave switch device role from being forwarded to another of the second slave switch devices having the second slave switch device role.

20 Claims, 22 Drawing Sheets

(56) References Cited

U.S. PATENT DOCUMENTS

| | | | |
|---|---|---|---|
| 2015/0085637 A1* | 3/2015 | Nahlous | H04L 45/28 370/217 |
| 2016/0085560 A1* | 3/2016 | Gourlay | G06F 9/45558 713/2 |
| 2019/0215597 A1* | 7/2019 | Ha | H04R 5/04 |

OTHER PUBLICATIONS

"Reggle—Exploring Network Technology," Mar. 3, 2012, https://reggle.wordpress.com/2012/03/03/data-center-stp-alternatives-loop-free-and-no-unused-links/.

* cited by examiner

SWITCHING FABRIC LOOP PREVENTION SYSTEM

BACKGROUND

The present disclosure relates generally to information handling systems, and more particularly to preventing communication loops in networked information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices, are often configured to provide switching fabrics. However, the configuration and management of conventional switching fabrics is associated with complexity, ongoing operational overhead, and relatively long times required for new system deployment. Software Defined Networking (SDN) techniques have been developed to alleviate some of the management and control issues associated with conventional switching fabrics, but are still associated with complex configuration operations and relatively long configuration times. In addition, such techniques require a device external to the switching fabric (e.g., a server device upon which an SDN controller operates in order to manage and control SDN switch devices in the switching fabric) in order to provide for management and control of the switching fabric, which increases the cost of managing and controlling the switching fabric. As such, conventional switching fabric configuration techniques increase the overhead associated with performing management and control operations on switch devices in that switching fabric including, for example, configuring switch devices to prevent communication loops.

Accordingly, it would be desirable to provide an improved switching fabric that provides for the prevention of communication loops between switch devices in the switching fabric.

SUMMARY

According to one embodiment, an Information Handling System (IHS) includes a processing system; and a memory system that is coupled to the processing system and that includes instructions that, when executed by the processing system, cause the processing system to provide a switching fabric loop prevention engine that is configured to: receive, from a directly connected device, directly connected device identification information; automatically determine, based on the directly connected device identification information received from the directly connected device, a first slave switch device role for the IHS; receive, from a master switch device, a first loop prevention configuration that configures the switching fabric loop prevention engine to prevent first type communications that have been received from one of a plurality of second slave switch devices having a second slave switch device role from being forwarded to another of the plurality of second slave switch devices having the second slave switch device role; receive, from one of the plurality of second slave switch devices having a second slave switch device role, a first type communication; and prevent the first type communication from being forwarded to another of the plurality of second slave switch devices having the second slave switch device role.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
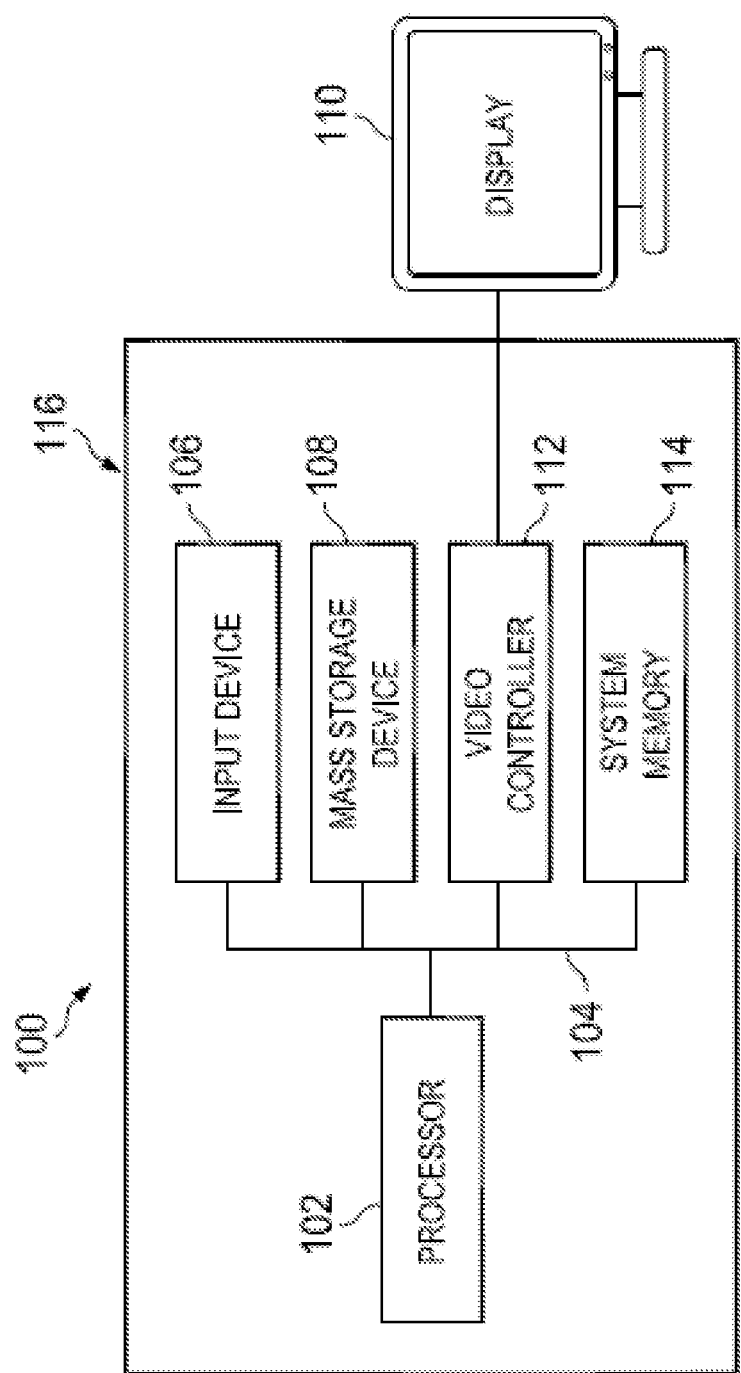
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
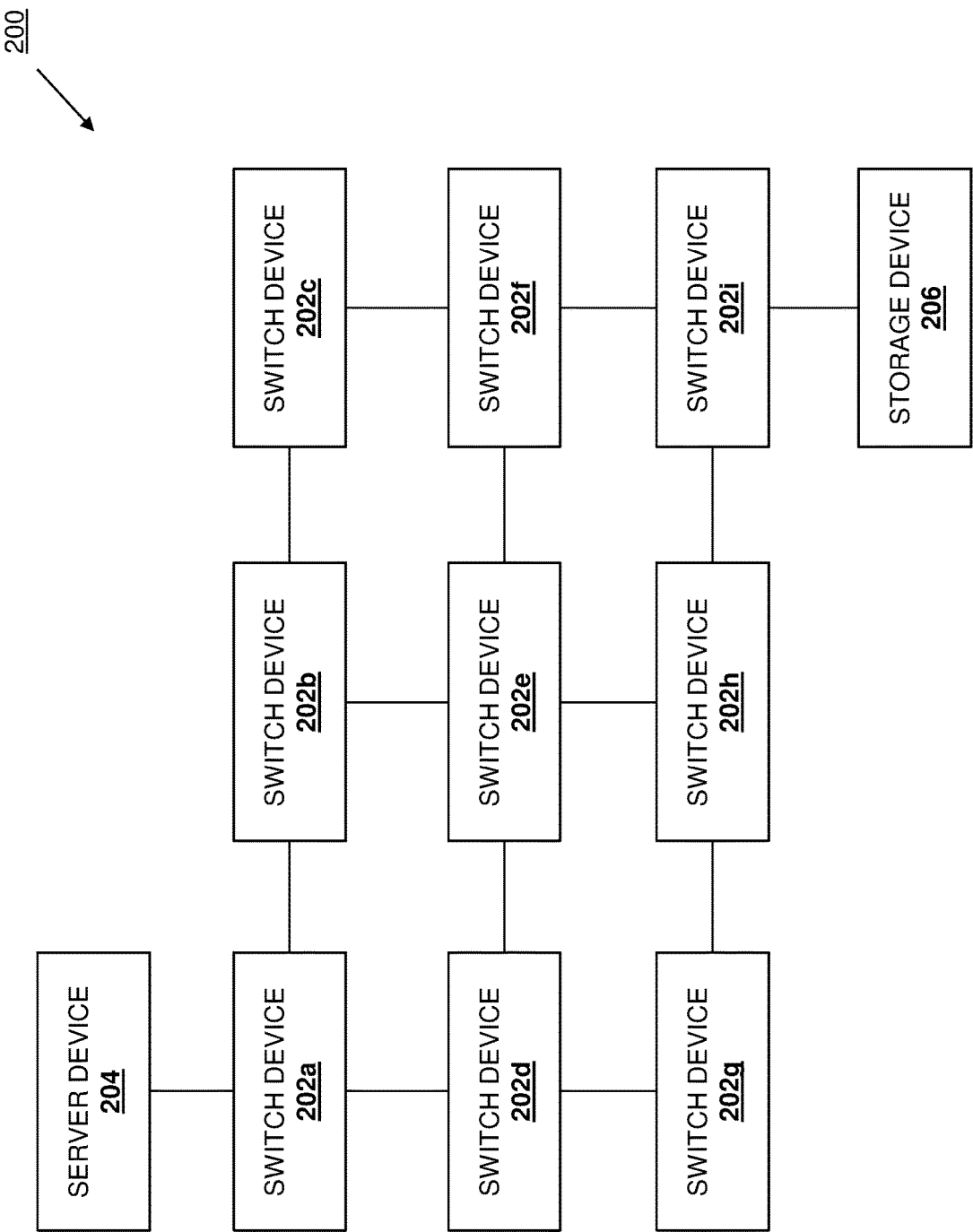
FIG. 2 is a schematic view illustrating an embodiment of a switching fabric configuration and management system.

Referring now to FIG. 2, an embodiment of a switching fabric configuration and management system 200 is illustrated. In the illustrated embodiment, the switching fabric configuration and management system 200 includes a plurality of networking devices such as, for example, the switch devices 202a, 202b, 202c, 202d, 202e, 202f, 202g, 202h, and 202i, illustrated in FIG. 2. In an embodiment, any or all of the switch devices 202a-i may be provided by the IHS 100 discussed above with reference to FIG. 1, and/or may include some or all of the components of the IHS 100. However, while illustrated and discussed as switch devices, one of skill in the art in possession of the present disclosure will recognize that a variety of networking devices may provide in the switching fabric configuration and management system 200 of the present disclosure, and any devices that may be configured to operate in a fabric similarly as discussed for the switching fabric described below may benefit from the teachings of the present disclosure as well. As would be understood by one of skill in the art in possession of the present disclosure, any of the switch devices 202a-i may be coupled to endhost device(s). For example, in the illustrated embodiment, the switch device 202a is coupled to an endhost device provided by a server device 204, and the switch device 202i is coupled to an endhost device provided by a storage device 206. Each of the server device 204 and storage device 206 may be provided by the IHS 100 discussed above with reference to FIG. 1, and/or may include some or all of the components of the IHS 100. However, one of skill in the art in possession of the present disclosure will recognize that many more endhost devices may (and typically will) be coupled to any of the switch devices 202a-i (e.g., an a datacenter) while remaining within the scope of the present disclosure, and may be provided by a variety of compute/storage nodes known in the art. Furthermore, management devices and/or other devices may be provided as endhost devices while remaining within the scope of the present disclosure as well. While a specific switching fabric configuration and management system 200 has been illustrated and described, one of skill in the art in possession of the present disclosure will recognize that the switching fabric configuration and management system of the present disclosure may include a variety of components and component configurations while remaining within the scope of the present disclosure as well.

Figure 3:
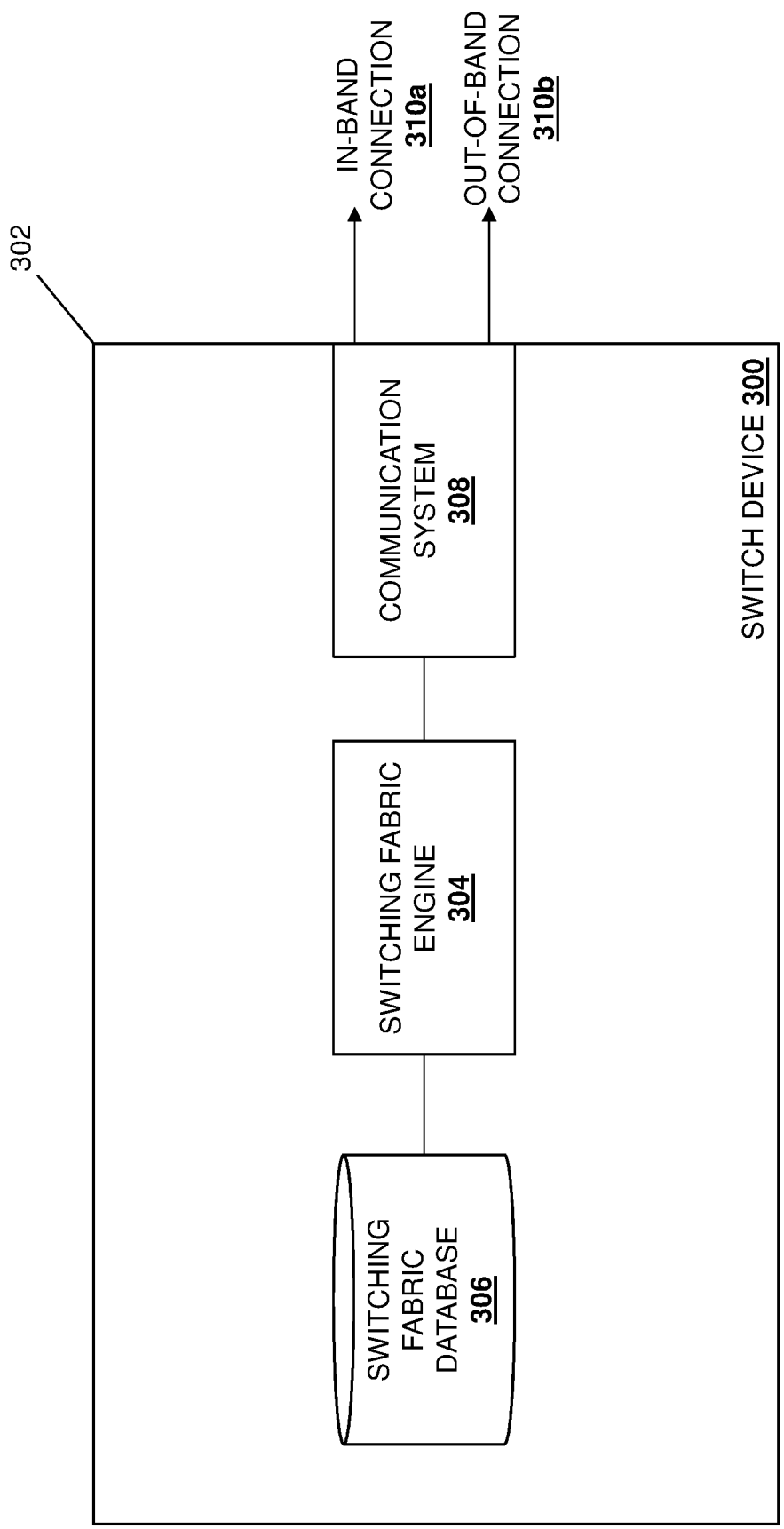
FIG. 3 is a schematic view illustrating an embodiment of a switch device that may be provided in the switching fabric configuration and management system of FIG. 2.

Referring now to FIG. 3, an embodiment of a switch device 300 is illustrated that may provide any or all of the switch devices 202a-i discussed above with reference to FIG. 2. As such, the switch device 300 may be provided by the IHS 100 discussed above with reference to FIG. 1 and/or may include some or all of the components of the IHS 100. Furthermore, while illustrated and discussed as a switch device, one of skill in the art in possession of the present disclosure will recognize that the functionality of the switch device 300 discussed below may be provided by other networking devices and/or other devices that are configured to operate in a fabric similarly as discussed for the switching fabric described below. In the illustrated embodiment, the switch device 300 includes a chassis 302 that houses the components of the switch device 300, only some of which are illustrated below.

For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a switching fabric engine 304 that is configured to perform the functionality of the switching fabric engines and/or switch devices discussed below. In a specific example, the switching fabric engine 304 may be provided, at least in part, by a Central Processing Unit (CPU) in the switch device 300 that is separate from a Network Processing Unit (NPU) in the switch device 300 that performs conventional switch device functions (e.g., data path determination and data path forwarding), and that may be included in instructions on the memory system that, when executed by the CPU, cause the CPU to provide the DELL® Operating System 10 (OS10) available from DELL® Inc., of Round Rock, Tex., United States, configures the NPU to perform the switch device functions, and/or performs a variety of other CPU functionality known in the art. Furthermore, at least some of the functionality of the switching fabric engine 304 may be provided by agent(s) included on the switch device 300.

The chassis 302 may also house a storage system (not illustrated, but which may include the storage 108 discussed above with reference to FIG. 1) that is coupled to the switching fabric engine 304 (e.g., via a coupling between the storage system and the processing system) and that includes a switching fabric database 306 that is configured to store any of the information utilized by the switching fabric engine 304 discussed below. The chassis 302 may also house a communication system 308 that is coupled to the switching fabric engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As can be seen, the communication system 308 may provide either or both of an in-band connection 310a and an out-of-band connection 310b to, for example, the other switch devices, endhosts, management devices, and/or any other device that would be apparent to one of skill in the art in possession of the present disclosure. While a specific switch device 300 has been illustrated and described, one of skill in the art in possession of the present disclosure will recognize that switch devices (or other devices operating according to the teachings of the present disclosure in a manner similar to that described below for the switch device 300) may include a variety of components and/or component configurations for providing conventional switch device functionality, as well as the functionality discussed below, while remaining within the scope of the present disclosure as well.

Figure 4:
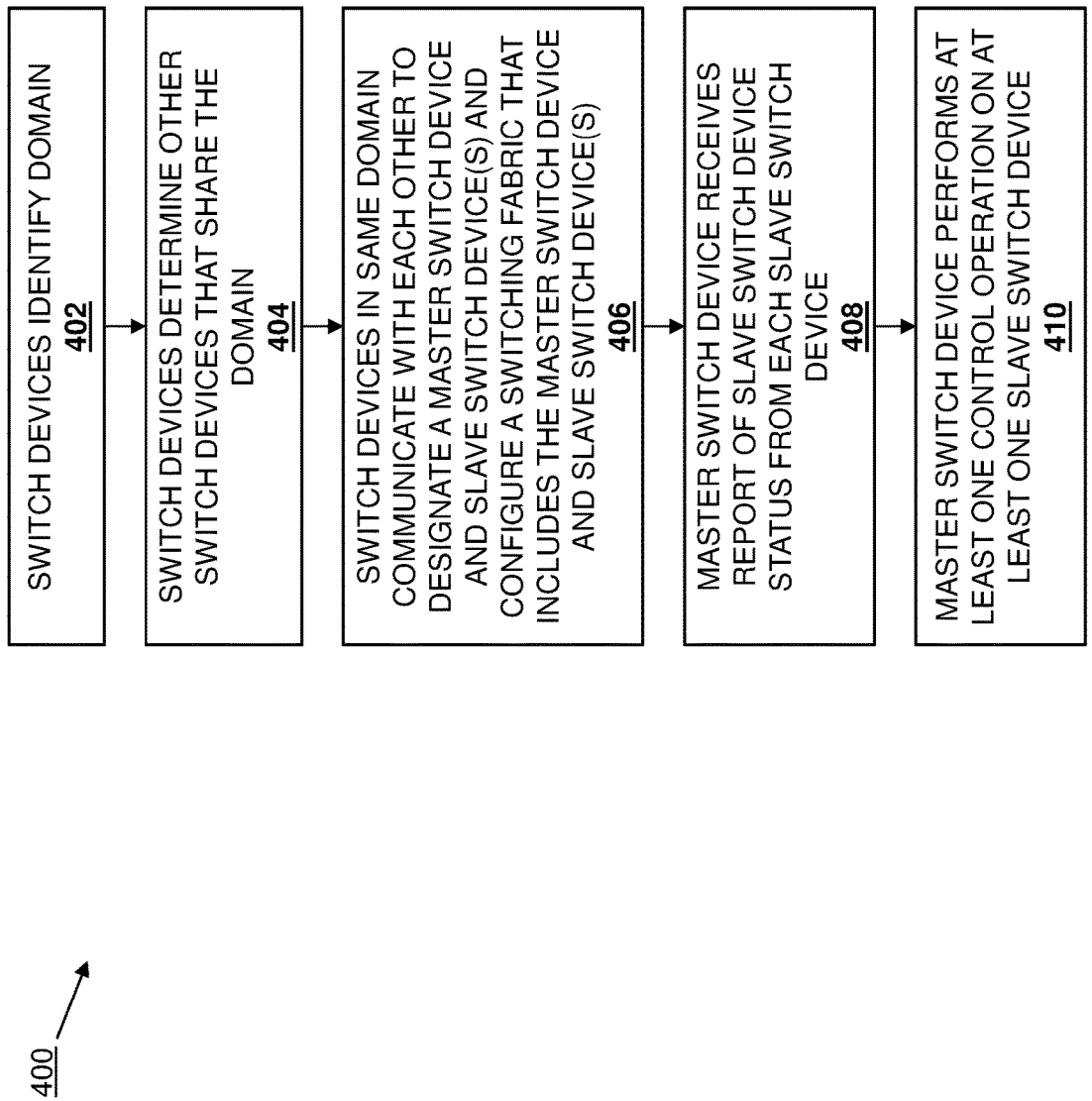
FIG. 4 is a flow chart illustrating an embodiment of a method for configuring and managing a switching fabric.

Referring now to FIG. 4, an embodiment of a method for configuring and managing a switching fabric is illustrated. As discussed below, the systems and methods of the present disclosure provide for the configuration of switching fabrics in a manner that reduces the complexity, ongoing operational overhead, and relatively long times required for new system deployment, as well as eliminates the need for to provide a device external to the switching fabric that performs the management and control functionality for the switching fabric, thus reducing the cost of managing and controlling the switching fabric. For example, the switching fabrics provided via the teachings of the present disclosure may only require a plurality of switch devices that operate to configure themselves into a switching fabric via communications that result in those devices discovering each other and forming a switch device cluster, and then electing one of those switch devices as a master switch device for the switch device cluster/switching fabric and the remaining switch devices as slave switch devices in the switch device cluster/switching fabric. Following the configuration of the switching fabric, the master switch device may perform control/management operations on any of the slave switch devices. Furthermore, the master switch device may share its master switch device configuration with each of the slave switch devices, which allows any of those slave switch devices to configure themselves as a master switch device in the event the switch device that is operating as the master switch device becomes unavailable. As such, in some embodiments, switching fabrics may be configured and managed without the need for an external device with a Central Processing Units (CPU), and may instead be configured and managed using the CPU in the switch devices that make up the switching fabric.

The method 400 begins at block 402 where switch devices identify a domain. In an embodiment, at or prior to block 402, each switch device that is to-be utilized to provide the switching fabric according to the teachings of the present disclosure may be provided a common domain identifier that identifies a common domain for those switch devices. For example, with reference to FIG. 2 and the examples provided below, each of the switch devices 202a-i are utilized to provide the switching fabric according to the teachings of the present disclosure, and a common domain identifier may be provided in the switching fabric database 306 included in each of those switch devices 202a-i/300. For example, a network administrator or other user of the switch devices 202a-i may provide the common domain identifier in the switching fabric database 306 of each of the switch devices 202a-i/300 in order to configure those switch devices 202a-i/300 for the switching fabric discussed below. However, while the use of a domain identifier in configuring the switching fabric of the present disclosure is described below, one of skill in the art in possession of the present disclosure will recognize that other switch device personality information (e.g., DELL® OS10 personality information) may be utilized to configure the switching fabric in manner similar to that described for the domain identifier below while remaining within the scope of the present disclosure as well.

As such, in some specific examples, the network administrator or other user may cable a management device to each switch device 300 (e.g., via a management port on the communication system 308), and use an input subsystem on the management device to log into each switch device 300 and provide the domain identifier to the switching fabric engine 304 for storage in the switching fabric database 306. However, in other specific examples, the network administrator or other user may use a management device to access each switch device 300 via a management network that is coupled to the communication system 308, and log into each switch device 300 to provide the domain identifier to the switching fabric engine 304 in each switch device 202a-i/300 for storage in the switching fabric database 306. While a few specific examples have been described, one of skill in the art in possession of the present disclosure will recognize that the common domain identifier may be provided in the switching fabric database 306 of each of the switch devices 202*a-i*/300 in a variety of manners that will fall within the scope of the present disclosure as well.

At block 402, the switching fabric engine 304 in each switch device 202*a-i*/300 may operate to access its switching fabric database 306 and identify the domain identifier stored therein. For example, at or prior to block 402, a network administrator or other user may couple together each of the switch devices 202*a-i* (e.g., via a variety of cabling and coupling techniques that would be apparent to one of skill in the art in possession of the present disclosure) and/or provide each of the switch devices 202*a-i* as part of a Local Area Network (LAN). Following the coupling together of the switch devices 202*a-i*, each of those switch devices 202*a-i* may be powered on, booted, and/or otherwise initialized and, in response, the switching fabric engine 304 in each switch device 202*a-i*/300 may operate to access its switching fabric database 306 and identify the domain identifier that was provided as discussed above. However, while a specific example has been described, one of skill in the art in possession of the present disclosure will recognize that a switch device may identify a domain identifier (and a corresponding domain in which that switch device belongs) in a variety of manners that will fall within the scope of the present disclosure as well. As such, following block 402, each switch device 202*a-i* may have identified the domain to which it belong, as per an assignment by a network administrator or other user of a common domain to each switch device that is to provide the switching fabric of the present disclosure.

The method 400 then proceeds to block 404 where the switch devices determine other switch devices that share the domain. In an embodiment, at block 404, the switching fabric engine 304 in each switch device 202*a-i*/300 may operate to transmit its domain identifier that was identified at block 402 to at least some of the other switch devices 202*a-i*/300. As discussed above, the switch devices 202*a-i*/300 may be part of a LAN, and the switching fabric engine 304 in each switch device 202*a-i*/300 may transmit its domain identifier over a Virtual LAN (VLAN) provided on that LAN. As such, at block 404 the switch devices 202*a-i*/300 may exchange their domain identifiers, and the switching fabric engine 304 in each switch device 202*a-i*/300 may operate to determine the switch devices that share its domain when it receives a domain identifier from those switch devices that matches its domain identifier. While the exchange of domain identifiers between switch devices to allow each of those switch devices to determine that they share a domain with the other switch devices has been described, one of skill in the art in possession of the present disclosure will recognize that switch devices may determine that they share a domain using a variety of techniques that will fall within the scope of the present disclosure as well.

The method 400 then proceeds to block 406 where the switch devices in the same domain communicate with each other to designate a master switch device and slave switch devices, and configure a switching fabric that includes the master switch device and the slave switch device. In an embodiment, at block 406, the switching fabric engine 304 in each switch device 202*a-i*/300 that was determined to share a domain at block 404 may operate to communicate with each other to designate a master switch device and slave switch devices. For example, the switching fabric engine 304 in each switch device 202*a-i*/300 that was determined to share a domain at block 404 may communicate using the Virtual Router Redundancy Protocol (VRRP) in order to designate the master switch device and slave switch devices at block 406. One of skill in the art in possession of the present disclosure will recognize that the VRRP is a computer networking protocol that is conventionally used to provide for the automatic assignment of available Internet Protocol (IP) router devices to participating host devices in order to increase the availability and reliability of routing paths via automatic default gateway selections on an IP network, and operates to create virtual router devices (e.g., abstractions of multiple router devices) that include a master router device and slave/backup router devices that operate as a group.

As such, one of skill in the art in possession of the present disclosure will recognize how the switching fabric engine 304 in each switch device 202*a-i*/300 that was determined to share a domain at block 404 may communicate using the VRRP in order to designate a master switch device and slave switch devices. For example, the communications between the switching fabric engine 304 in each switch device 202*a-i*/300 using the VRRP in order to designate a master switch device and slave switch devices may include the exchange of IP addresses and the election of the switch device having the lowest IP address as the master switch device, which results in the remaining switch devices being designated as slave switch devices. In some embodiments, the designation of the master switch device may include that master switch device being assigned a unique master switch device IP address that, as discussed below, may be utilized by the slave switch devices to communicate with the master switch device.

Figure 5:
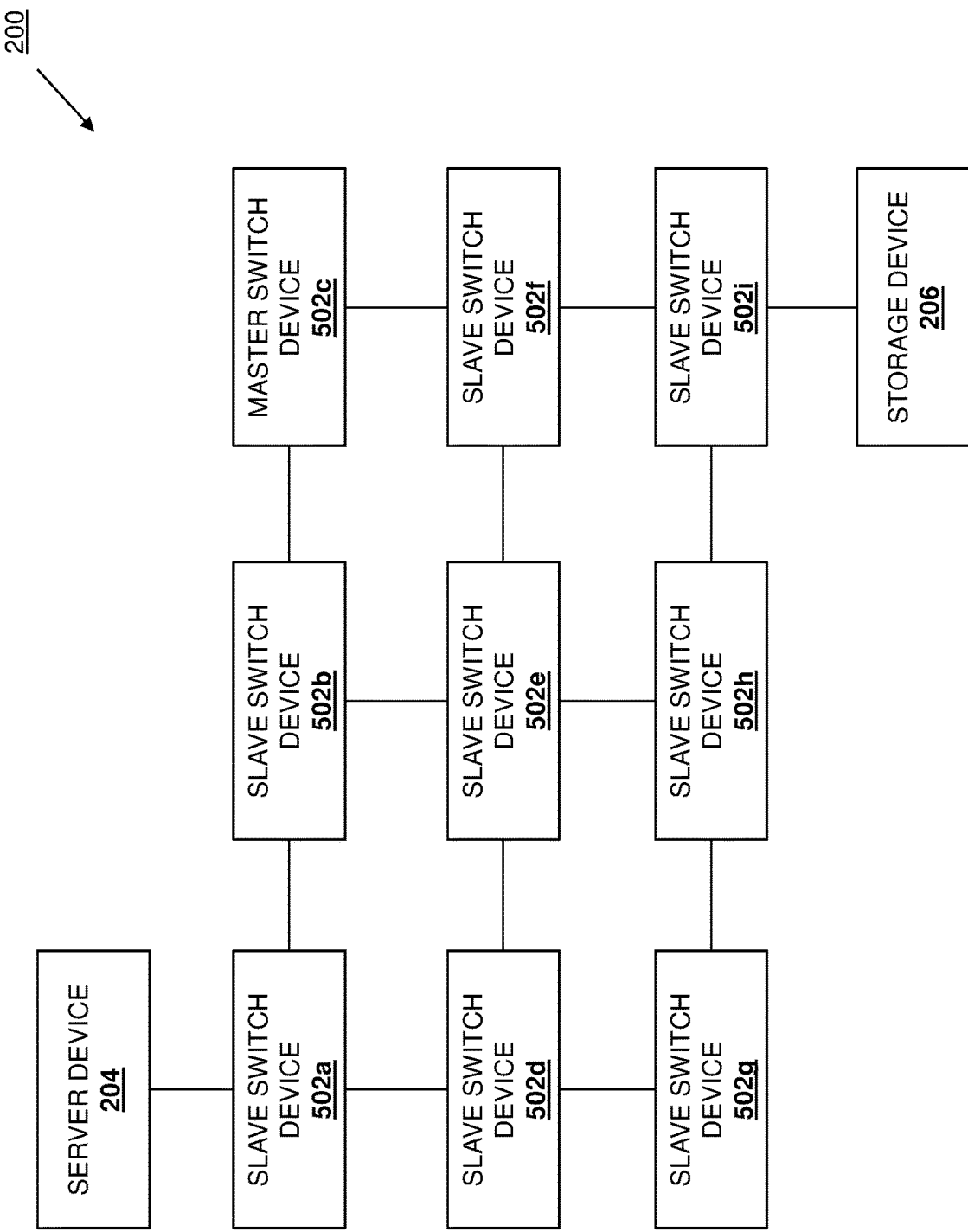
FIG. 5 is a schematic view illustrating an embodiment of the switching fabric switching fabric configuration and management system of FIG. 2 during the method of FIG. 4.

With reference to FIG. 5, an embodiment of the switching fabric configuration and management system 200 discussed above with reference to FIG. 2 is illustrated following the designation of the master switch device and the slave switch devices at block 406. For example, in the embodiment illustrated in FIG. 5 and with reference to FIG. 2, the switch device 202*c* has been designated as a master switch device 502*c*, while the switch devices 202*a*, 202*b*, and 202*d-i* have been designated as slave switch devices 502*a*, 502*b*, and 502*d-i*, respectively. In a specific example, at block 406, at least some of the functionality of the switching fabric engine 304 in each switch device 202*a-i*/300 that allows for the designation of the master switch device and slave switch devices at block 406 may be provided by Keepalived routing software, available from www.keepalived.org, which one of skill in the art in possession of the present disclosure will recognize uses the VRRP. However, while a specific software and protocol has been discussed as being used to designate the master switch device and slave switch devices of the present disclosure, one of skill in the art in possession of the present disclosure will recognize that the master switch device and slave switch devices may be designated in a variety of manners that will fall within the scope of the present disclosure as well.

Figure 6:
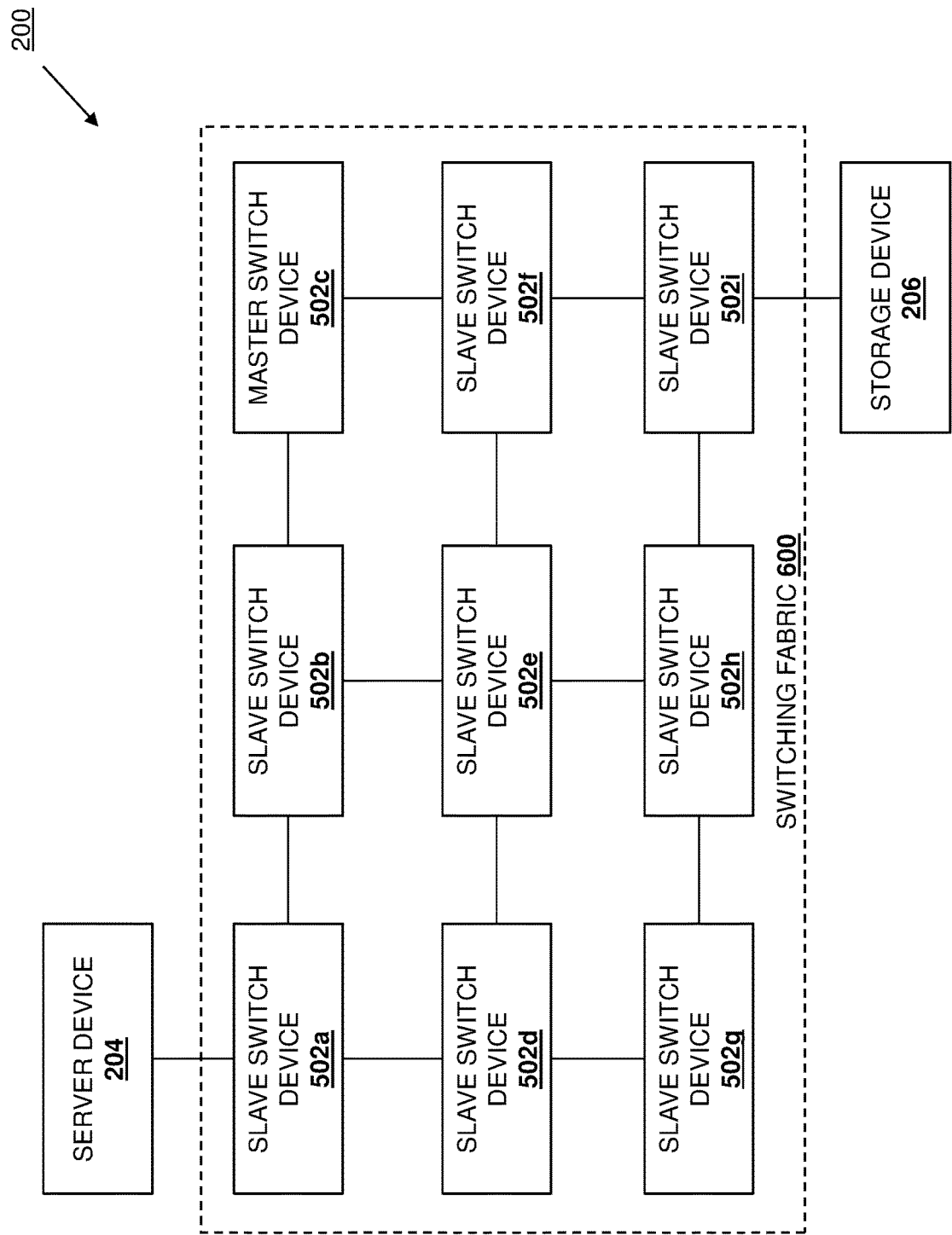
FIG. 6 is a schematic view illustrating an embodiment of the switching fabric switching fabric configuration and management system of FIG. 2 during the method of FIG. 4.

The method 400 then proceeds to block 408 where the master switch device receives a report of a slave switch device status from each slave switch device. In an embodiment, at block 408, the switching fabric engine 304 in each switch device 502*a*/300, 502*b*/300, and 502*d-i*/300 may operate to report its slave switch device status by, for example, generating a slave switch device status report that is directed to the unique master switch device IP address that was assigned to the master switch device 502*c* as discussed above, and transmitting the slave switch device status report to that unique master switch device IP address. As such, at block 408, the switching fabric engine 304 in the master switch device 502c receives the slave switch device status report from each of the slave switch devices 502a, 502b, and 502d-i. As illustrated in FIG. 6, and as would be understood by one of skill in the art in possession of the present disclosure, the designation of the master switch device 502c and the slave switch devices 502a, 502b, and 502d-i, along with the reporting of the slave switch device status by each of the slave switch devices 502a, 502b, and 502d-i to the master switch device 502c, allows for the configuration of a switch device cluster by the master switch device 502c that provides a switching fabric 600 that includes that master switch device 502c and those slave switch devices 502a, 502b, and 502d-l, and may include a variety of other operations by the master switch device 502c that provides for the configuration of the switching fabric 600 based on any of a variety of switching fabric policies that would be apparent to one of skill in the art in possession of the present disclosure The method 400 then proceeds to block 410 where the master switch device performs at least one control operation on at least one slave switch device. In an embodiment, at block 410 and following the configuration of the switch device cluster that provides the switching fabric 600, the master switch device 502c and the slave switch devices 502a, 502b, and 502d-i may interact in a variety of manners that provides for the management and control of the switch device cluster that provides the switching fabric 600. For example, one of skill in the art in possession of the present disclosure will recognize the master switch device 502c and the slave switch devices 502a, 502b, and 502d-i provided according to the teachings of the present disclosure may synchronize their states using a distributed object model in order to maintain the switch device cluster that provides the switching fabric 600.

In some embodiments, the communications between the master switch device 502c and the slave switch devices 502a, 502b, and 502d-i may be enabled by each switching fabric engine 304 in each of the master switch device 502c/300 and the slave switch devices 502a/300, 502b/300, and 502d-i/300 performing publish/subscribe (pub/sub) operations, which one of skill in the art in possession of the present disclosure will recognize provides a messaging pattern where senders of messages (called publishers) do not program the messages to be sent directly to specific receivers (called subscribers), but instead categorize published messages into classes without knowledge of which subscribers there may be, while subscribers express interest in one or more classes and only receive messages that are of interest, without knowledge of which publishers there are. In a specific example, the pub/sub operations utilized by the master switch device 502c and the slave switch devices 502a, 502b, and 502d-i may be achieved via a conjunction of Control Plane Services (CPS) available in the DELL® OS10 discussed above, and REmote Dictionary Server (REDIS), which is an open-source in-memory data structure project that implements a distributed, in-memory, key-value database with optional durability.

In some embodiments, the master switch device 502c and the slave switch devices 502a, 502b, and 502d-i may perform database sharing in order to share some or all of the contents of their respective switching fabric databases 306, which may be achieved via a conjunction of CPS, REDIS, and application level client synchronization. In a specific example, the master switch device 502c and the slave switch devices 502a, 502b, and 502d-i may perform the pub/sub operations discussed above, along with the utilization of synchronization applications, in order to provide for the sharing of a master switch device configuration file that describes the configuration of the master switch device 502c. For example, the switching fabric engine 304 in the master switch device 502c/300 may retrieve a master switch device configuration file that is stored in its switching fabric database 306, and publish that master switch device configuration file through the communication system 308 for retrieval by each of the slave switch devices 502a, 502b, and 502d-i. As such, the switching fabric engine 304 in each slave switch devices 502a, 502b, and 502d-i may retrieve that master switch device configuration file via its communication system 308 (e.g., via the subscriptions discussed above), and store that master switch device configuration file in its switching fabric database 306. (e.g., "replicating" the master switch device configuration file on each of the slave switch devices 502a, 502b, and 502d-i).

The master switch device configuration file sharing/replication allows for any of the slave switch devices 502a, 502b, and 502d-i to take over in the event the master switch device 502c become unavailable. For example, the switching fabric engine 304 in each slave switch devices 502a, 502b, and 502d-i may be configured to determine that the master switch device 502c (a primary master switch device in this example) is unavailable (e.g., in response to failing to receive regular communications and/or responses from the master switch device 502c) and, in response, retrieve the master switch device configuration file replicated in its switching fabric database 306 as discussed above, and use that master switch device configuration file to configure itself as a master switch device (e.g., a secondary master switch device in this example) that is capable of performing all of the management/control functionality available from the primary master switch device The determination of which of the slave switch devices 502a, 502b, and 502d-i will take over for an unavailable master switch device may be made based on, for example, the slave switch device with the lowest IP address, keepalived/VRRP master election schemes, and/or a variety of other criteria that would be apparent to one of skill in the art in possession of the present disclosure In some embodiments, the switching fabric engine 304 in the master switch device 502c may utilize either or both of the in-band connection 310a and the out-of-band connection 310b provided by its communication system 308 in order to provide for management access and internal operations. For example, the master switch device 502c may be the only switch device in the switch device cluster that provides the switching fabric 600 that is exposed to external management entities such as the server device 204 and storage device 206. The exposure of the master switch device 502c may be enabled by the switching fabric engine 304 in the master switch device 502c exposing a REpresentational State Transfer (REST) Application Programming Interface (API) that allows external entities to access management functionality in the master switch device 502c, which allows control/management/monitoring functionality performed by the master switch device 502c at block 410 to be controlled by an management device. As such, the master switch device 502c may provide a single management "touch point" for the switching fabric 600 using a REST model that may allow in-band or out-of-band management access via, for example, a virtual IP (vIP) address assigned to the master switch device 502c (i.e., a master vIP), and/or physical IP addresses (e.g., IPv6 addresses) assigned to the master switch device 502c and slave switch devices 502a, 502b, and 502d-i. As will be appreciated by one of skill in the art in possession of the present disclosure, the structure of the REST model allows the master switch device 502*c* to capture the core relationships among the elements in the switching fabric 600.

In some embodiments, the switching fabric engine 304 in the master switch device 502*c* may maintain the liveliness of each of the slave switch devices 502*a*, 502*b*, and 502*d-i* in order to, for example, enable the determination of when any of the slave switch devices 502*a*, 502*b*, and 502*d-i* become unavailable. Similarly, the switching fabric engine 304 in each of the slave switch devices 502*a*, 502*b*, and 502*d-i* may maintain its own connectivity to the master switch device 502*c*. As such, the switching fabric engine 304 in the master switch device 502*c* may listen for events from each of the slave switch devices 502*a*, 502*b*, and 502*d-i* and respond to those events, and the switching fabric engine 304 in each of the slave switch devices 502*a*, 502*b*, and 502*d-i* may listen to events from the master switch device 502*c* and may separately respond to those events.

In some embodiments, the switch device cluster that provides the switching fabric 600 may support multiple fabrics. For example, as would be understood by one of skill in the art in possession of the present disclosure, ports on different switch devices in the switching fabric 600 may be provided as part of a Link Aggregation Group (LAG) using Virtual Link Trunking (VLT), a proprietary aggregation protocol available from DELL® Inc. of Round Rock, Tex., United States, that provides those switch devices as part of a VLT fabric (i.e., a forwarding fabric) that is supported by the switching fabric 600 (e.g., provided by a switch device cluster/management fabric).

In some embodiments, the forwarding plane provided by the switching fabric 600 does not require special vendor proprietary features from the Network Processing Unit (NPU) that is utilized to provide switching functionality in the switch devices 300. As such, the switching fabric engine 304 may be independent of the NPU (i.e., hardware independent), and may only depend on the operating system that is utilized by the switch device 300 and provided by a Central Processing Unit (CPU) in the switch device 300 that communicates with the NPU via any of a variety of interfaces that would be apparent to one of skill in the art in possession of the present disclosure. Furthermore, the functionality of the master switch device 502*c* and the slave switch devices 502*a*, 502*b*, and 502*d-i* may be enabled via a modular plug-in architecture and distributed models. In some examples, configurations via of the switch device cluster that provides the switching fabric 600 may be automated in a variety of manners including, for example, a set of policies (e.g., policies to configure server devices in a particular manner when connected to the switching fabric 600 based on, for example, a server device identifier detected in that server device upon its connection to the switching fabric 600) and/or meta data (e.g., fabric mode meta data, attached system discovery identity meta data, etc.) injection.

As such, at block 410, the switching fabric engine 304 in the master switch device 502*c* may perform any of a variety of control operation on one or more of the slave switch devices 502*a*, 502*b*, and 502*d-i* that may include, for example, configuring a Link Aggregation Group (LAG) using a plurality of ports on one or more of the slave switch devices 502*a*, 502*b*, and 502*d-i*; setting up the forwarding of data traffic on one or more of the slave switch devices 502*a*, 502*b*, and 502*d-i*; providing bindings between ports and VLANs; providing bindings between ports, LAGs, and VLANs; utilizing the Link Aggregation Control Protocol (LACP) on ports; performing physical port configurations such as Maximum Transmission Unit (MTU) configurations and auto-negotiation configurations; providing storage configurations; providing data uplink related configurations such as VLAN configurations, LACP configurations, and LAG configurations; and/or a variety of other control operations that would be apparent to one of skill in the art in possession of the present disclosure Thus, systems and methods have been described that provide switching fabrics using a plurality of switch devices that operate to configure themselves into a switching fabric via communications that result in those devices discovering each other and forming a switch device cluster, and then electing one of those switch devices as a master switch device for the switch device cluster/switching fabric such that the remaining switch devices are designated as slave switch devices in the switch device cluster/switching fabric. Following the configuration of the switching fabric, the master switch device may perform control operations on any of the slave switch devices. Furthermore, the master switch device may share its master switch device configuration with each of the slave switch device, which allows any of those slave switch devices to configure themselves as a master switch device in the event the switch device that is operating as the master switch device becomes unavailable. As such, switching fabrics may be configured and managed without the need for an external device with its own Central Processing Unit (CPU), and may instead be configured and managed using the CPU in the switch devices that are already being used to provide the switching fabric. Thus, the configuration of switching fabrics is provided in a manner that reduces the complexity, ongoing operational overhead, and relatively long times required for new system deployment, as well as eliminates the need for to provide a device external to the switching fabric that performs the management and control functionality for the switching fabric, thus reducing the cost of managing and controlling the switching fabric.

Figure 7:
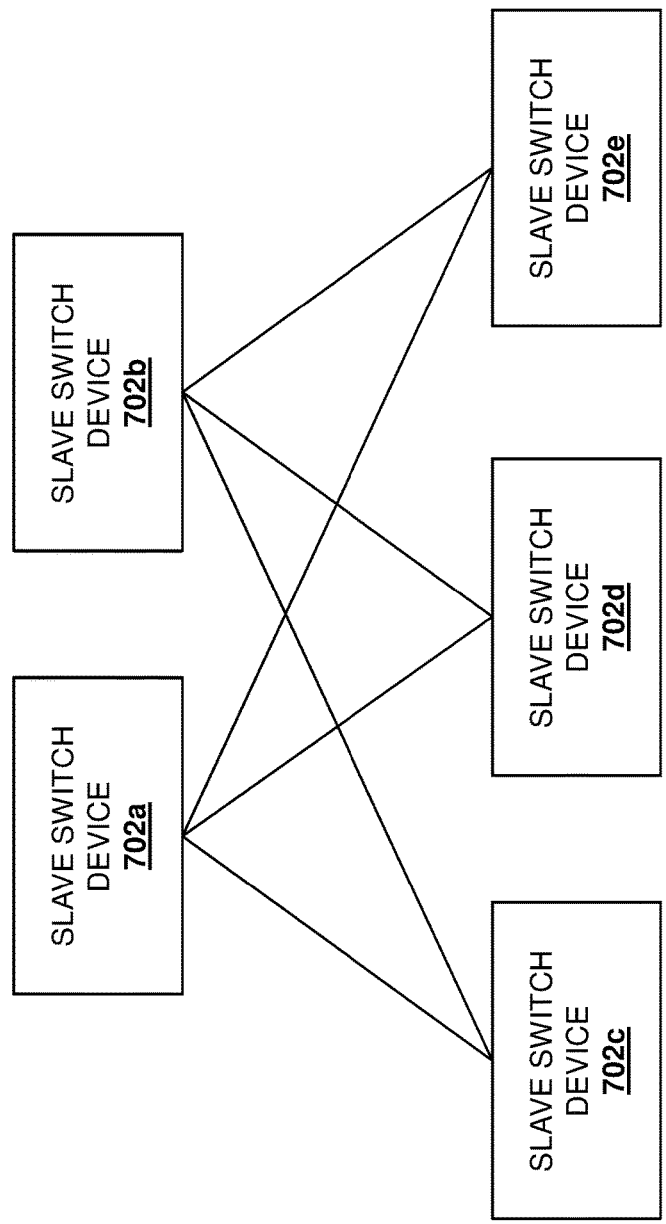
FIG. 7 is a schematic view illustrating an embodiment of a portion of the switching fabric configuration and management system of FIG. 6 providing an automatic switching fabric role determination system.

In some embodiments, the switching fabric configuration and management system 200 of the present disclosure allows for the performance of management and control operations on switch devices in the switching fabric 600 such as, for example, automated role determinations by the switch devices in the switching fabric 600. Referring now to FIG. 7, an embodiment of a portion of the switching fabric configuration and management system 200 of FIG. 6 is illustrated that may be utilized to provide an automatic switching fabric role determination system 700. In the illustrated embodiment, the automatic switching fabric role determination system 700 includes a plurality of slave switch devices 702*a*, 702*b*, 702*c*, 702*d*, and 702*e* that are coupled together (e.g., cabled together via cables (e.g., Ethernet cables) connected to ports on the slave switch devices 702*a-e*) and that may each have been configured to operate as the slave switch devices in the manner described above. As such, any or all of the slave switch devices 702*a-e* may be provided by the IHS 100 discussed above with reference to FIG. 1, and/or may include some or all of the components of the IHS 100. However, while a specific configuration of switch devices is illustrated in FIG. 7, one of skill in the art in possession of the present disclosure will recognize that a variety of switch device may be configured in a variety of manners to provide the automatic switching fabric role determination system of the present disclosure while remaining within its scope as well. For example, any of the slave switch devices 702*a-e* may be replaced by the master switch device 502*c* discussed above with reference to FIGS. 5 and 6, additional slave switch devices may be included in the automatic switching fabric role determination system 700, etc.

Figure 8:
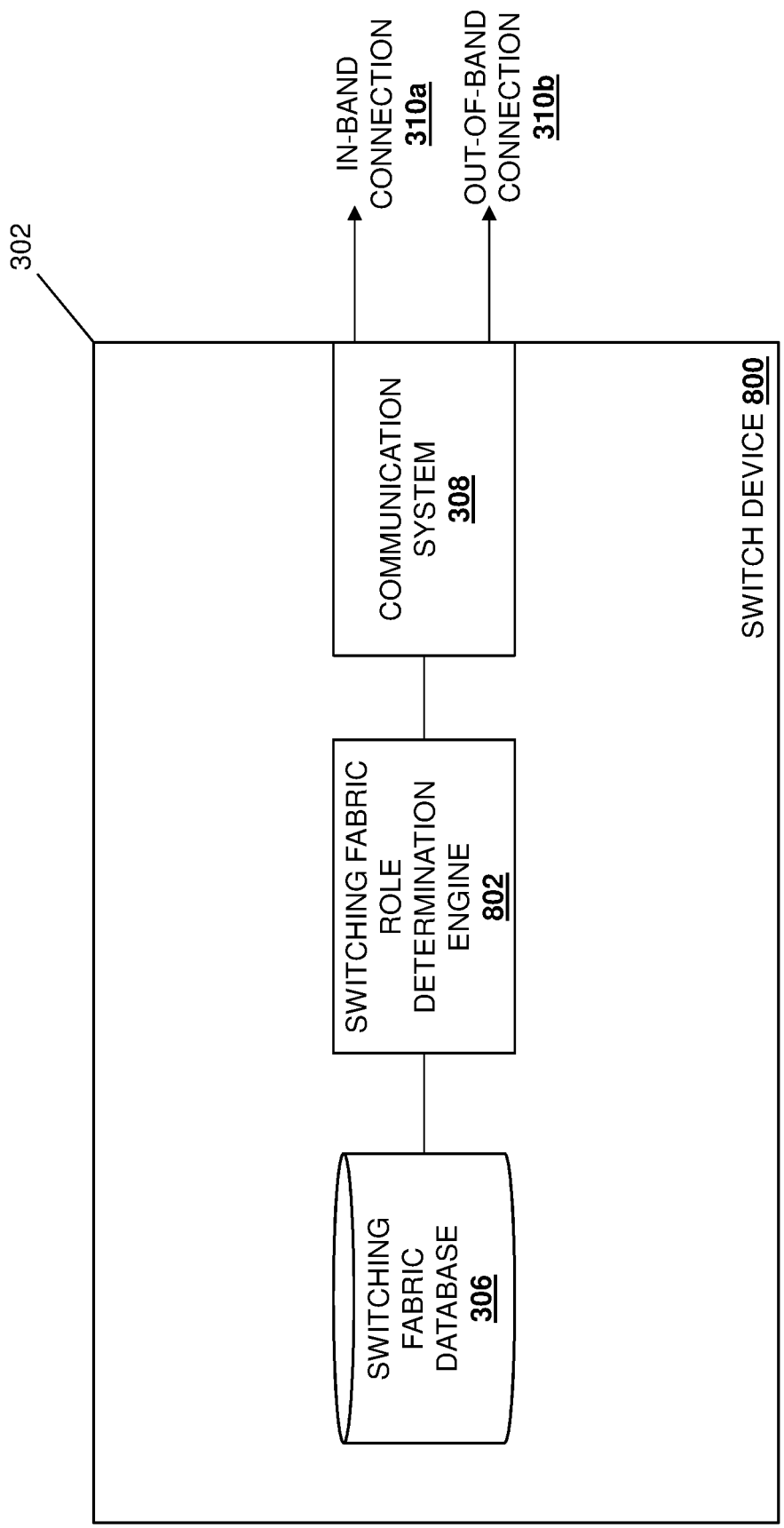
FIG. 8 is a schematic view illustrating an embodiment of the switch device of FIG. 3 that is configured to provide a switch device in the automatic switching fabric role determination system of FIG. 7.

Referring now to FIG. 8, an embodiment of a switch device 800 is illustrated that may provide any of the slave switch devices 702*a-e* discussed above with reference to FIG. 7, and that includes similar components as the switch device 300 discussed above with reference to FIG. 3. As such, elements numbers for similar components in the switch device 300 and the switch device 800 are provided with the same reference numbers. As discussed above, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a switching fabric role determination engine 802 that is configured to perform the functionality of the switching fabric role determination engines and/or switch devices discussed below. In the specific example illustrated in FIG. 8, the switching fabric engine 304 in the switch device 300 has been replaced with the switching fabric role determination engine 802 in the switch device 800 that may be provided via the configuration of the switch device 300 as a slave switch device (or master switch device) in the manner discussed above. However, while a specific switch device has been illustrated and described, one of skill in the art in possession of the present disclosure will recognize that switch devices may include a variety of components and/or component configurations for performing the functionality discussed below while remaining within the scope of the present disclosure.

Figure 9:
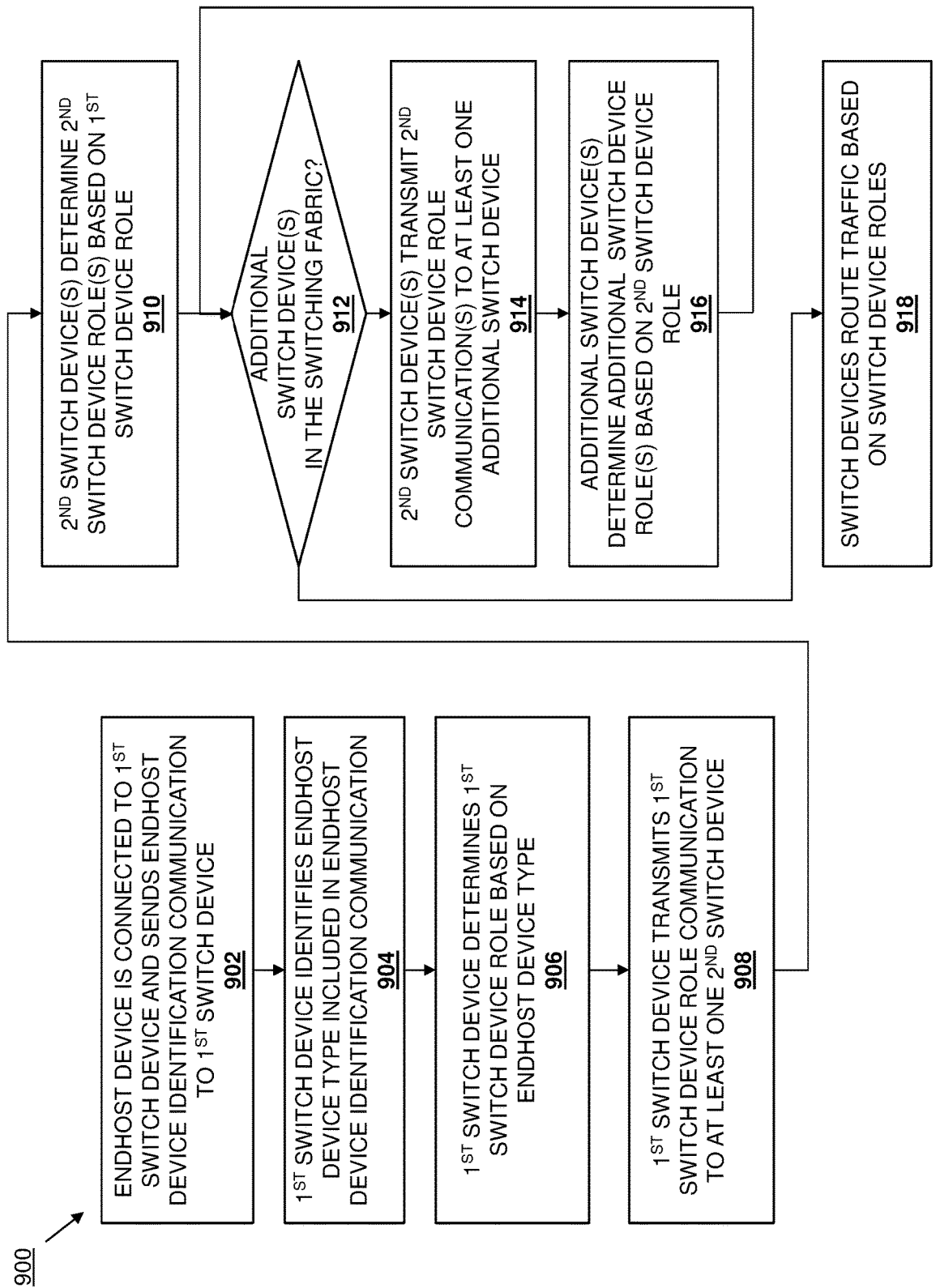
FIG. 9 is a flow chart illustrating an embodiment of a method for automatically assigning roles to switch devices in a switching fabric.

Referring now to FIG. 9, an embodiment of a method 900 for automatically determining roles in a switching fabric is illustrated. As discussed below, the systems and methods of the present disclosure may provide for the automatic determination of roles by switch devices in a switching fabric. In some examples, this is accomplished by a first switch device in the switching fabric receiving an endhost device identification communication from an endhost device following the connection of that endhost device to the first switch device, and identifying an endhost device type of the endhost device in that endhost device identification communication. The first switch device then determines a leaf switch device role for the first switch device based on the endhost device type, and transmits first switch device role communication(s) that identify the leaf switch device role to second switch device(s) in the switching fabric that are connected to the first switch device. When the second switch device(s) receive the first switch device role communication, they determine a spine switch device role for the second switch device(s) based on the leaf switch device role included in the first switch device role communication received from the first switch device. The second switch device(s) may then transmit second switch device role communication(s) that identify the spine switch device role to third switch device(s) in the switching fabric that are connected to the second switch device(s), which allows those third switch devices to determine their switch device roles, and so on until all of the switch device roles of all the switch devices in the switching fabric are determined.

Figure 10A:
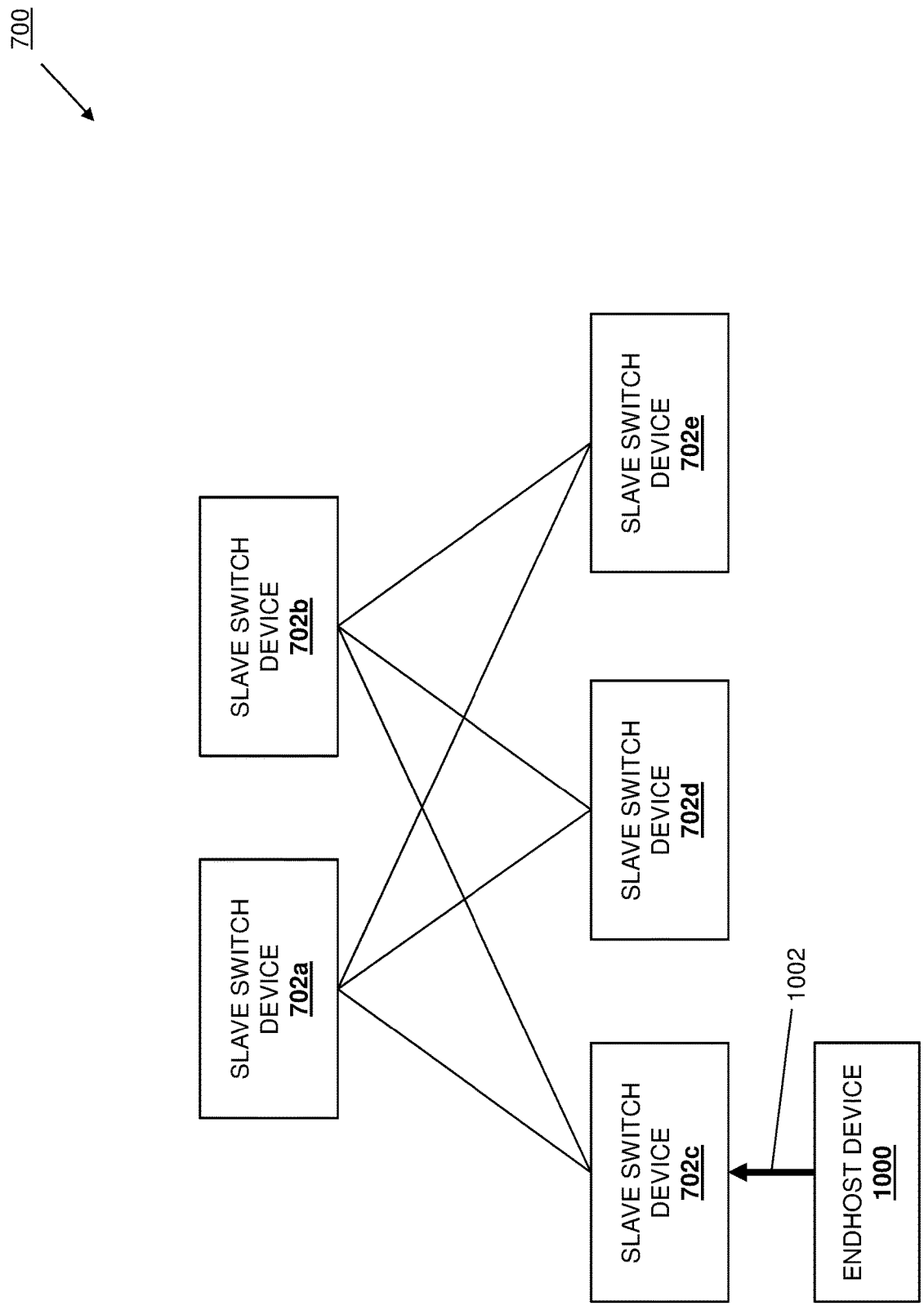
FIG. 10A is a schematic view illustrating an embodiment of communications in the automatic switching fabric role assignment system of FIG. 7 during the method of FIG. 9.

The method 900 begins at block 902 where an endhost device is connected to a first switch device and sends an endhost device identification communication to the first switch device. In an embodiment, at block 902, an endhost device such as, for example, a storage device, a server device, and/or other endhost devices known in the art, may be connected to one of the switch devices in the switching fabric 600. With reference to FIG. 10A, an endhost device 1000 is illustrated as connected to the slave switch device 702*c*, which may include connecting a cable (e.g., an Ethernet cable) to ports on the endhost device 1000 and the slave switch device 702*c*. Following the connection of the endhost device 1000 to the slave switch device 702*c*, the endhost device 1000 may generate an endhost device identification communication and transmit the endhost device identification communication to the slave switch device 702*c*, as illustrated by element 1002 in FIG. 10A. For example, following a power-on, reset, boot, and/or other initialization of the endhost device 1000, the endhost device 1000 may generate the endhost device identification communication as a Link Layer Discovery Protocol (LLDP) data packet that includes a Type-Length-Value (TLV) data structure, and store the endhost device type in that TLV data structure. In a specific example, the endhost device 1000 is a storage device, and a storage device type may be provided in the TLV data structure included in the LLDP packet (e.g., information may be included in TLV data structure that identifies that the storage device is an endhost provided by a particular type of storage device.) The endhost device 1000 may then transmit the LLDP data packet to the slave switch device 702*a* such that the switching fabric role determination engine 802 in the slave switch device 702*c*/800 receives that LLDP data packet via its communication system 308.

The method 900 then proceeds to block 904 where the first switch device identifies an endhost device type included in the endhost device identification communication. In an embodiment, at block 904, the switching fabric role determination engine 802 in the slave switch device 702*c*/800 identifies the endhost device type stored in the TLV data structure included in the LLDP data packet received from the endhost device 1000 at block 902. Continuing with the specific example provided above, the switching fabric role determination engine 802 in the slave switch device 702*c*/800 may use the endhost device type to identify that the device that has been connected to its communication system 308 is an endhost provided by a particular type of storage device. However, while a specific endhost device identifying itself utilizing a specific type of communication has been described, one of skill in the art in possession of the present disclosure will recognize that a variety of endhost devices (e.g., server devices, etc.) may be coupled to the switching fabric and may identify themselves in a variety of manners that will fall within the scope of the present disclosure as well.

The method 900 then proceeds to block 906 where the first switch device determines a first switch device role based on the endhost device type. In an embodiment, prior to the method 900, none of the slave switch devices 702*a-e* may have been assigned a switch device role. At block 906, the switching fabric role determination engine 802 in the slave switch device 702*c*/800 determines a first switch device role for the slave switch device 702*c*/800 based on the endhost device type that was identified in the TLV data structure included in the LLDP data packet received from the endhost device 1000 at block 902. For example, the switching fabric role determination engine 802 in the slave switch device 702*c*/800 may be configured to determine a leaf switch device role for any switch device that is directly connected to an endhost device or a spine switch device, to determine a spine switch device role for any switch device that is directly connected to a leaf switch device, and/or determine any other switch device role for a switch device based on the device role of another device that is directly connected to that switch device. As such, continuing with the example provided above, based on the identification that the device that was connected to its communication system 308 was an endhost provided by a particular type of storage device, the switching fabric role determination engine 802 in the slave switch device 702c/800 determines a leaf switch device role for the slave switch device 702c/800. However, while determinations of a few specific switch device roles based on the device roles of directly connected devices have been described, one of skill in the art in possession of the present disclosure will recognize that a variety of switch device roles may be determined based on a variety of device roles of directly connected devices while remaining within the scope of the present disclosure as well.

Figure 10B:
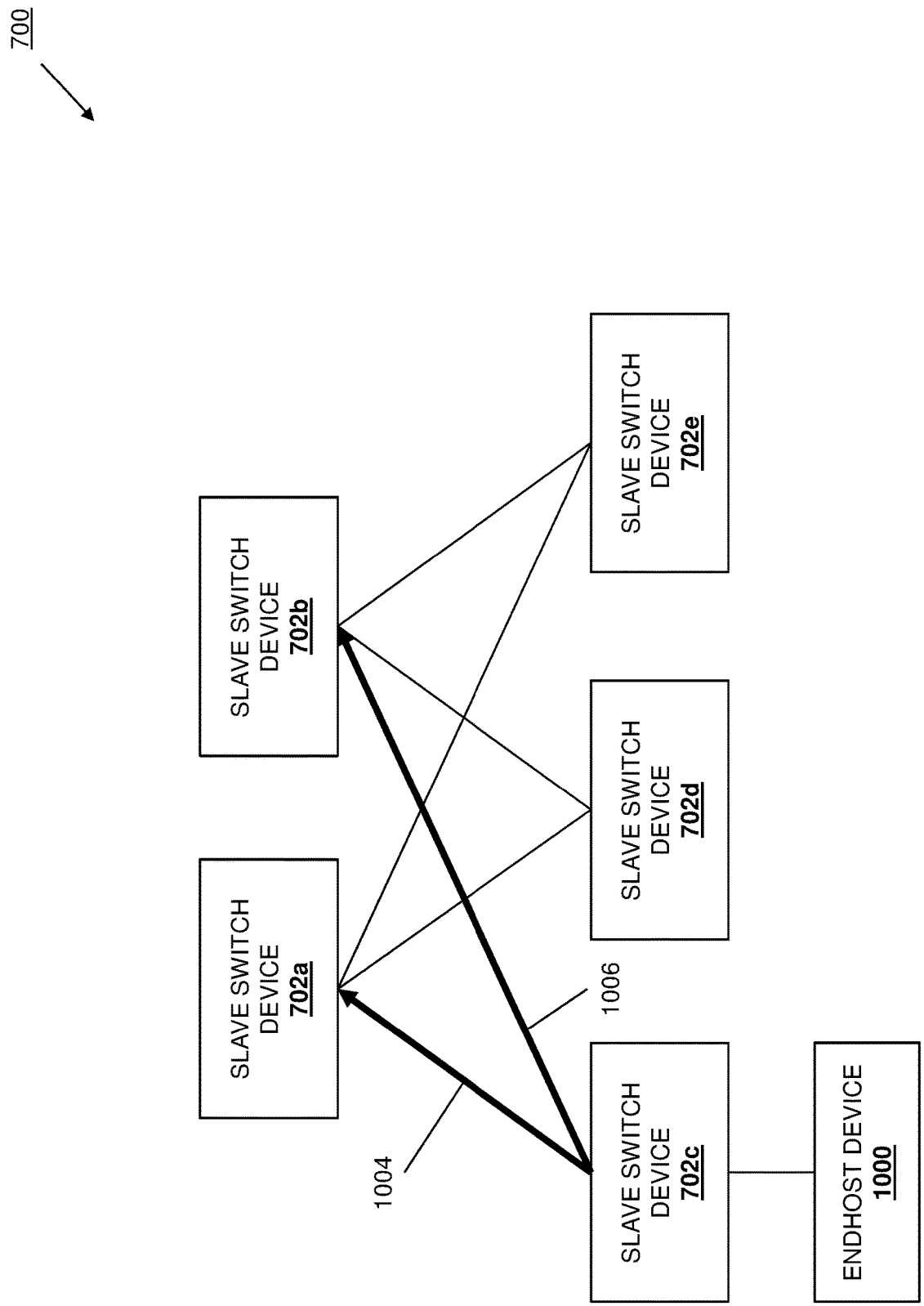
FIG. 10B is a schematic view illustrating an embodiment of communications in the automatic switching fabric role assignment system of FIG. 7 during the method of FIG. 9.
Figure 10C:
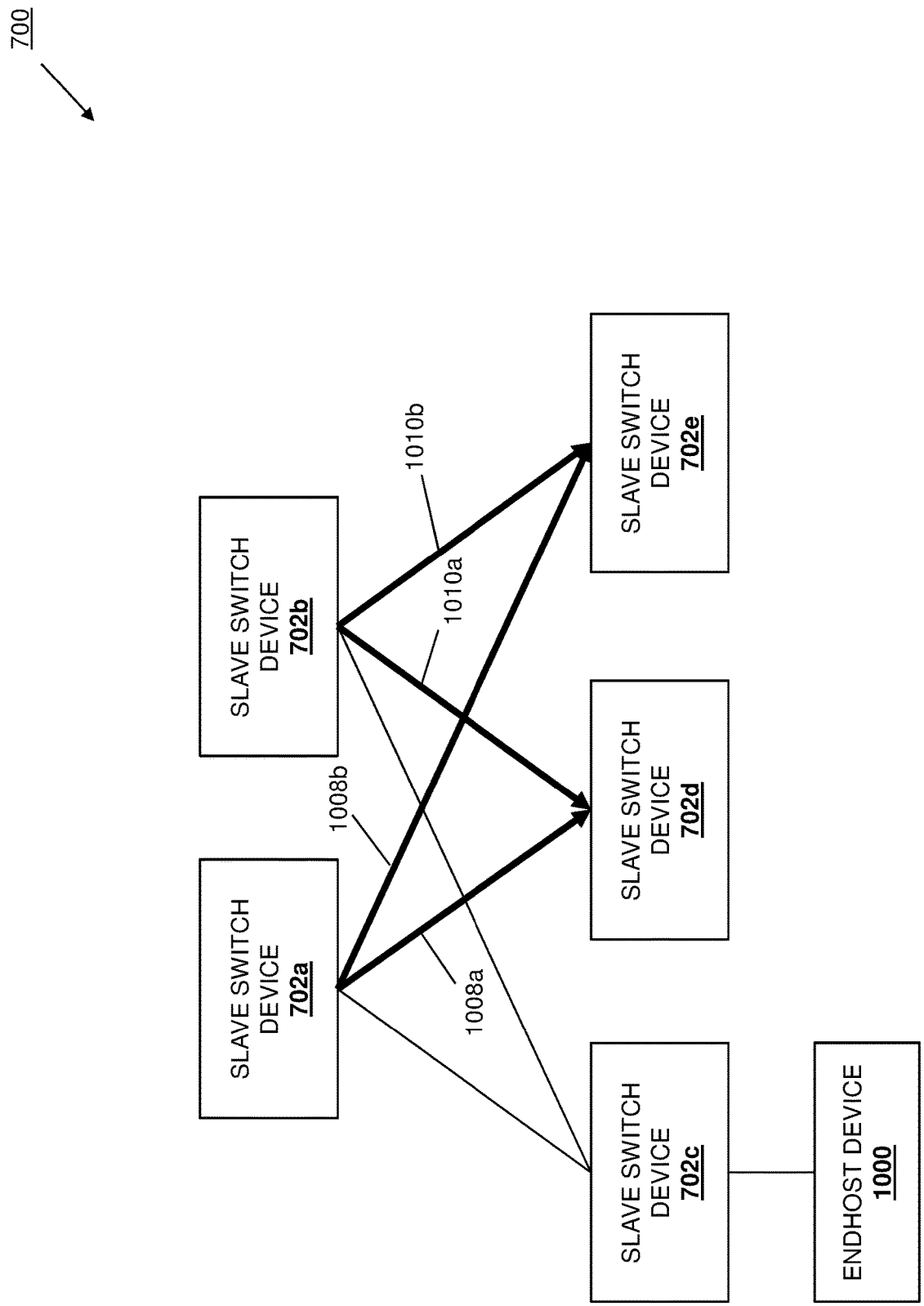
FIG. 10C is a schematic view illustrating an embodiment of communications in the automatic switching fabric role assignment system of FIG. 7 during the method of FIG. 9.

The method 900 then proceeds to block 908 where the first switch device transmits a first switch device role communication to at least one second switch device. In an embodiment, at block 908 and following the determination of the first switch device role for the slave switch device 702c/800, the switching fabric role determination engine 802 in the slave switch device 702c/800 may generate an first switch device role communication and transmit the first switch device role communication to the slave switch devices 702a and 702b, as illustrated by elements 1004 and 1006 in FIG. 10B. For example, following the determination of the first switch device role for the slave switch device 702c/800, the switching fabric role determination engine 802 in the slave switch device 702c/800 may generate the first switch device role communication that is provided by an LLDP data packet that includes a TLV data structure, and store the first switch device role in that TLV data structure. Continuing with the specific example discussed above, the slave switch device 702c/800 has determined a leaf switch device role for itself, and a leaf switch device role may be provided in the TLV data structure included in the LLDP packet (e.g., information may be included in TLV data structure that identifies that the slave switch device 702c/800 is an leaf switch device.) The switching fabric role determination engine 802 in the slave switch device 702c/800 may then transmit the LLDP data packets to the slave switch devices 702a and 702b such that the switching fabric role determination engine 802 in each of the slave switch devices 702a/800 and 702b/800 receives a respective LLDP data packet via its communication system 308.

The method 900 then proceeds to block 910 where the second switch device(s) determine second switch device role(s) based on the first switch device role. In an embodiment, at block 910, the switching fabric role determination engine 802 in each of the slave switch devices 702a/800 and 702b/800 determine respective second switch device roles for the slave switch devices 702a/800 and 702b/800, respectively, based on the first switch device role that was identified in the TLV data structure included in the respective LLDP data packet received from the slave switch device 702c/800 at block 908. Similarly as discussed above, the switching fabric role determination engine 802 in each of the slave switch devices 702a/800 and 702b/800 may be configured to determine a leaf switch device role for any switch device that is directly connected to an endhost device or a spine switch device, to determine a spine switch device role for any switch device that is directly connected to a leaf switch device, and/or determine any other role for a switch device based on the device role of another device that is directly connected to that switch device. As such, continuing with the example provided above, based on the identification of the slave switch device 702c/800 as a leaf switch device, the switching fabric role determination engine 802 in each of the slave switch devices 702a/800 and 702b/800 determines a respective spine switch device role for the slave switch devices 702a/800 and 702b/800, respectively. Similarly as discussed above, while determinations of a few specific switch device roles based on the device roles of directly connected devices have been described, one of skill in the art in possession of the present disclosure will recognize that a variety of switch device roles may be determined based on a variety of device roles of directly connected devices while remaining within the scope of the present disclosure as well.

The method 900 then proceeds to decision block 912 where the method 900 may proceed differently depending on whether there are additional switch device(s) in the switching fabric. If, at decision block 912, there are additional switch device(s) in the switching fabric, the method 900 proceeds to block 914 where the second switch device(s) transmit second switch device role communication(s) to the additional switch device(s). In an embodiment, at block 914 and following the determination of the second switch device roles for the slave switch devices 702a/800 and 702b/800, the switching fabric role determination engine 802 in each of the slave switch devices 702a/800 and 702b/800 may each generate second switch device role communications, and transmit the second switch device role communications to the slave switch devices 702d and 702e, as illustrated by elements 1008a, 1008b, 1010a, and 1010b in FIG. 10O. For example, following the determination of the second switch device roles for the slave switch devices 702a/800 and 702b/800, the switching fabric role determination engine 802 in each of the slave switch devices 702a/800 and 702b/800 may generate the second switch device role communications that is provided by LLDP data packets that each include a TLV data structure, and store their second switch device role in the TLV data structure. Continuing with the specific example discussed above, the slave switch device 702a/800 has determined a spine switch device role for itself, and a spine switch device role may be provided in the TLV data structure of its LLDP data packet(s) (e.g., information may be included in the TLV data structure that identifies that the slave switch device 702a/800 is a spine switch device). Similarly, the slave switch device 702b/800 has determined a spine switch device role for itself, and a spine switch device role may be provided in the TLV data structure of its LLDP data packet(s) (e.g., information may be included in the TLV data structure that identifies that the slave switch device 702a/800 is a spine switch device.) The switching fabric role determination engine 802 in the slave switch devices 702a/800 and 702b/800 may then transmit their LLDP data packet(s) to the slave switch devices 702d and 702e such that the switching fabric role determination engine 802 in the slave switch devices 702d/800 and 702e/800 receive those LLDP data packets via their communication systems 308.

Figure 11A:
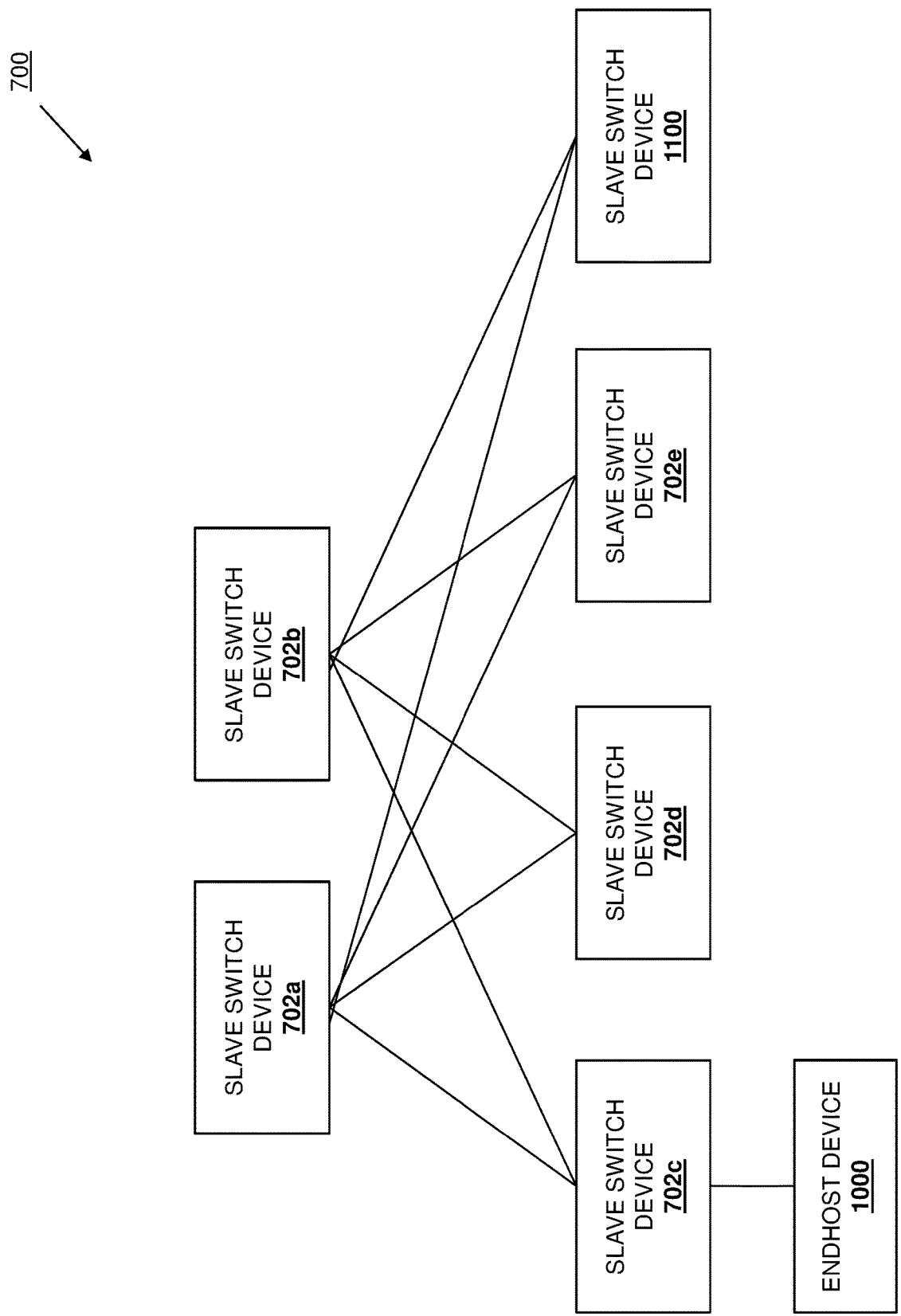
FIG. 11A is a schematic view illustrating an embodiment of the automatic switching fabric role assignment system of FIG. 10C with an additional switch device added.
Figure 11B:
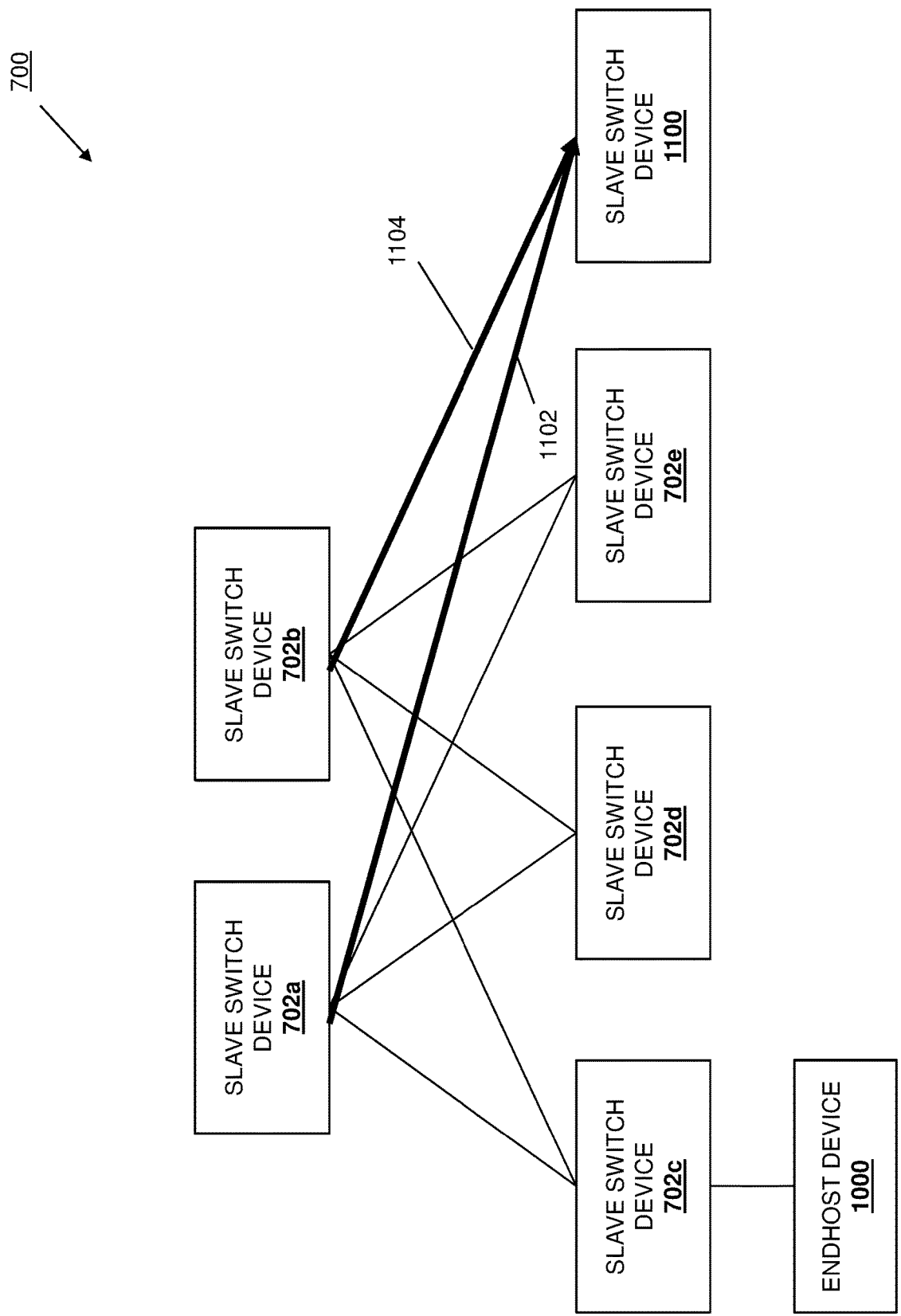
FIG. 11B is a schematic view illustrating an embodiment of communications in the automatic switching fabric role assignment system of FIG. 11A.

The method 900 then proceeds to block 916 where the additional switch device(s) determine additional switch device role(s) based on the second switch device role(s). In an embodiment, at block 916, the switching fabric role determination engine 802 in each of the slave switch devices 702d/800 and 702e/800 determine third switch device roles for the slave switch devices 702d/800 and 702e/800, respectively, based on the second switch device roles that were identified in the TLV data structure included in the LLDP data packets received from the slave switch devices 702a/800 and 702b/800 at block 908. Similarly as discussed above, the switching fabric role determination engine 802 in each of the slave switch devices 702*d*/800 and 702*e*/800 may be configured to determine a leaf switch device role for any switch device that is directly connected to an endhost device or a spine switch device, to determine a spine switch device role for any switch device that is directly connected to a leaf switch device, and/or determine any other role for a switch device based on the device role of another device that is directly connected to that switch device. As such, continuing with the example provided above, based on the identification of the slave switch devices 702*a*/800 and 702*b*/800 as spine switch devices, the switching fabric role determination engine 802 in each of the slave switch devices 702*d*/800 and 702*e*/800 determines a respective leaf switch device role for the slave switch devices 702*d*/800 and 702*e*/800, respectively. Similarly as discussed above, while determinations of a few specific switch device roles based on the device roles of directly connected devices have been described, one of skill in the art in possession of the present disclosure will recognize that a variety of switch device roles may be determined based on a variety of device roles of directly connected devices while remaining within the scope of the present disclosure as well The method 900 then returns to decision block 912. As such, decision block 912 and blocks 914 and 916 may loop until each of the switch devices in a switching fabric have determined their switch device roles. Thus, when there are not additional switch device(s) in the switching fabric (as in the example illustrated in FIGS. 7 and 10A-C), the method 900 proceeds to block 918 where the switch devices in the switching fabric route traffic based on their switch device roles. In an embodiment, at block 918, the slave switch devices 702*a* and 702*b* operate as spine switch devices (based on their spine switch devices roles determined at block 910 of the method 900), the slave switch device 702*c* operates as a leaf switch device (based on its leaf switch device role determined at block 906 of the method 900), and the slave switch devices 702*d* and 702*e* operate as leaf switch devices (based on their leaf switch devices roles determined at block 916 of the method 900), in order to route traffic to and from the endhost device 1000 (e.g., via other switch devices that are part of the switching fabric, other endhost devices that are connected to the switching fabric, and/or any other device that would be apparent to one of skill in the art in possession of the present disclosure), prevent loops in the switching fabric, and/or perform a variety of other switch device functionality that would be apparent to one of skill in the art in possession of the present disclosure In some embodiments, following the method 900, switch devices may be added to the switching fabric, and may determine their switch device roles in substantially the same manner as discussed above during the method 900. For example, with reference to FIG. 11A, a slave switch device 1100 is illustrated as added to the switching fabric via its coupling to the slave switch device 702*a* and the slave switch device 702*b* (e.g., via cabling provided between respective ports on the slaves switch devices 702*a* and 702*b*, and the ports on the slave switch device 1100.) Following the powering on, resetting, booting, and/or other initialization of the switch device 1100, the switching fabric role determination engine 802 in each of the slave switch devices 702*a*/800 and 702*b*/800 may each generate second switch device role communications, and transmit the second switch device role communications to the slave switch device 1100, as illustrated by elements 1102 and 1004 in FIG. 11B. For example, the switching fabric role determination engine 802 in each of the slave switch devices 702*a*/800 and 702*b*/800 may generate the second switch device role communications that are provided by LLDP data packets that each include a TLV data structure, and store their second switch device role (e.g., the spine switch device role discussed above) in the TLV data structure. The switching fabric role determination engine 802 in the slave switch devices 702*a*/800 and 702*b*/800 may then transmit their LLDP data packet(s) to the slave switch device 1100 such that the switching fabric role determination engine 802 in the slave switch device 1100 receives those LLDP data packets via its communication systems 308.

The switching fabric role determination engine 802 in the slave switch device 1100 may then determine a fourth switch device role for the slave switch device 1100/800 based on the second switch device roles that were identified in the TLV data structure included in the LLDP data packets received from the slave switch devices 702*a*/800 and 702*b*/800. Similarly as discussed above, the switching fabric role determination engine 802 in the slave switch device 1100/800 may be configured to determine a leaf switch device role for any switch device that is directly connected to an endhost device or a spine switch device, to determine a spine switch device role for any switch device that is directly connected to a leaf switch device, and/or determine any other role for a switch device based on the device role of another device that is directly connected to that switch device. As such, continuing with the example provided above, based on the identification of the slave switch devices 702*a*/800 and 702*b*/800 as a spine switch devices, the switching fabric role determination engine 802 in the slave switch device 1100/800 determines a leaf switch device role for the slave switch device 1100/800. As such, switch devices added to the switching fabric may automatically determine their roles in a manner similar to the switch devices that are connected together in a switching fabric prior to any role assignment or determination.

Thus, systems and methods have been described that provide for the automatic determination of roles by switch devices in a switching fabric. For examples, switch devices may be connected together in a switching fabric, with none of those switch devices having been assigned a switch device role. When a first switch device in the switching fabric receives an endhost device identification communication from an endhost device following the direct connection of that endhost device to the first switch device, it identifies an endhost device type of the endhost device in that endhost device identification communication. The first switch device then determines a leaf switch device role for itself based on the determination that it is directly connected to an endhost device (i.e., based on the endhost device type), and transmits first switch device role communication(s) that identify the leaf switch device role to second switch device (s) in the switching fabric that are directly connected to the first switch device. When the second switch device(s) receive the first switch device role communication, they determine a spine switch device role for themselves based on the determination that they are each directly connected to a leaf switch device (i.e., based on the leaf switch device role). The second switch device(s) may then transmit second switch device role communication(s) that identify the spine switch device role to third switch device(s) in the switching fabric that are directly connected to the second switch device(s), which allows those third switch devices to determine their switch device roles, and so on until all of the switch device roles in the switching fabric are determined.

Figure 12:
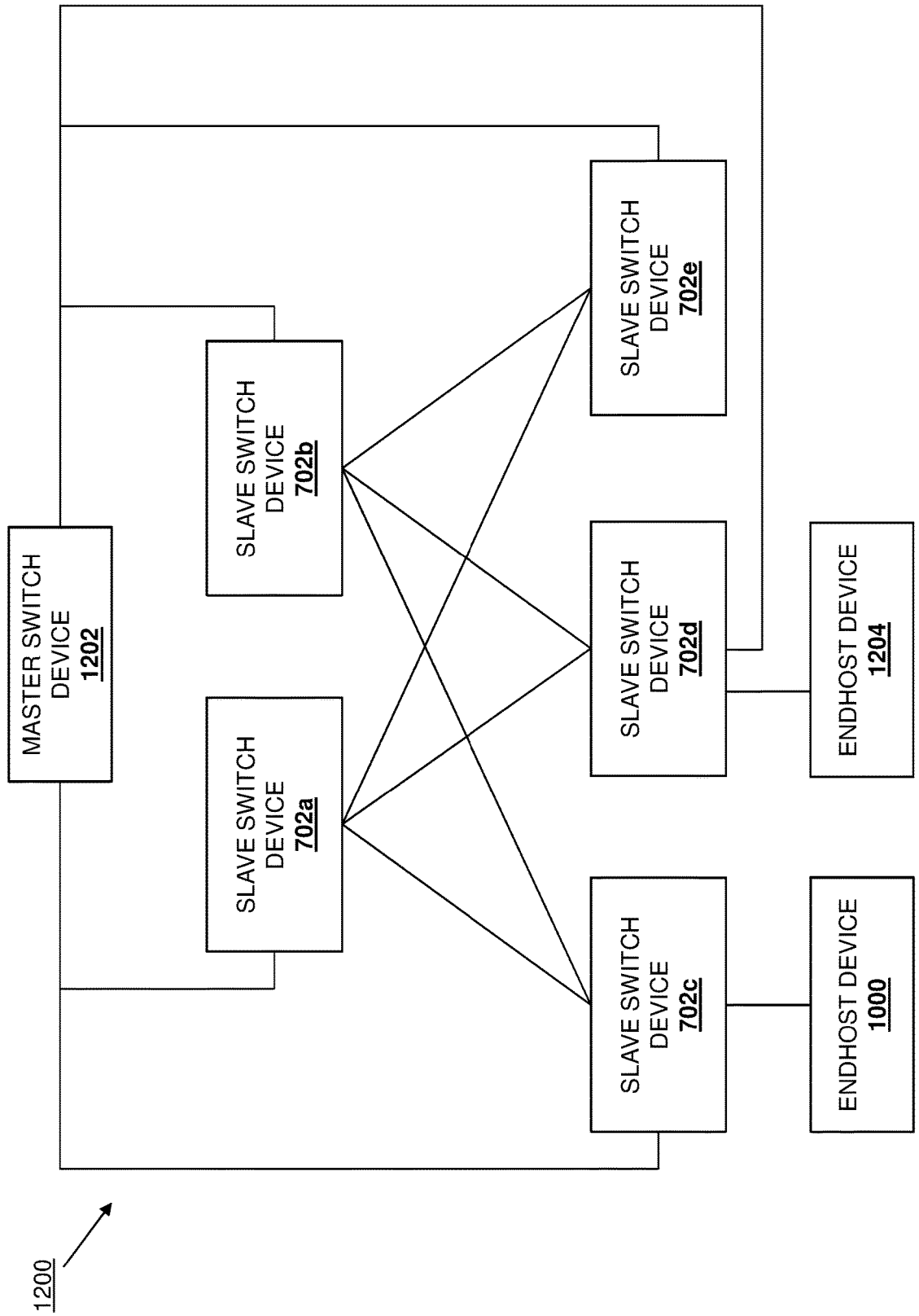
FIG. 12 is a schematic view illustrating an embodiment of a portion of the switching fabric configuration and management system of FIG. 6 providing a switching fabric loop prevention system.

In some embodiments, the automated role determinations by the switch devices in the switching fabric 600 allows for the performance of improved management and control operations on switch devices in the switching fabric 600 such as, for example, the prevention of loops in the switching fabric 600. Referring now to FIG. 12, an embodiment of the automatic switching fabric role determination system 700 following the method 900 is illustrated that may be utilized to provide a switching fabric loop prevention system 1200. In the illustrated embodiment, the switching fabric loop prevention system 1200 includes the slave switch devices 702a, 702b, 702c, 702d, and 702e that are coupled together (e.g., cabled together via cables (e.g., Ethernet cables) connected to ports on the slave switch devices 702a-e), and each coupled to a master switch device 1202 (e.g., cabled together via cables (e.g., Ethernet cables) connected to ports on the master switch device 1202 and the slave switch devices 702a-e). In addition, for the purposes of the examples provided below, an endhost device 1204 is illustrated as coupled to the slave switch device 702d as well.

As described above, each of the slave switch devices 702a-e may have been configured to operate as the slave switch devices according to the method 400 of FIG. 4, with the slave switch devices 702a and 702b having determined their spine switch device roles and the slave switch devices 702c-e having determined their leaf switch devices roles according to the method 900 of FIG. 9. As such, any or all of the slave switch devices 702a-e may be provided by the IHS 100 discussed above with reference to FIG. 1, and/or may include some or all of the components of the IHS 100. However, while a specific configuration of switch devices is illustrated in FIG. 12, one of skill in the art in possession of the present disclosure will recognize that a variety of switch devices may be configured in a variety of manners to provide the switching fabric loop prevention system of the present disclosure while remaining within its scope as well. For example, any of the slave switch devices 702a-e may be replaced by the master switch device 1202 discussed above, additional slave switch devices may be included in the switching fabric loop prevention system 1200, etc.

Figure 13:
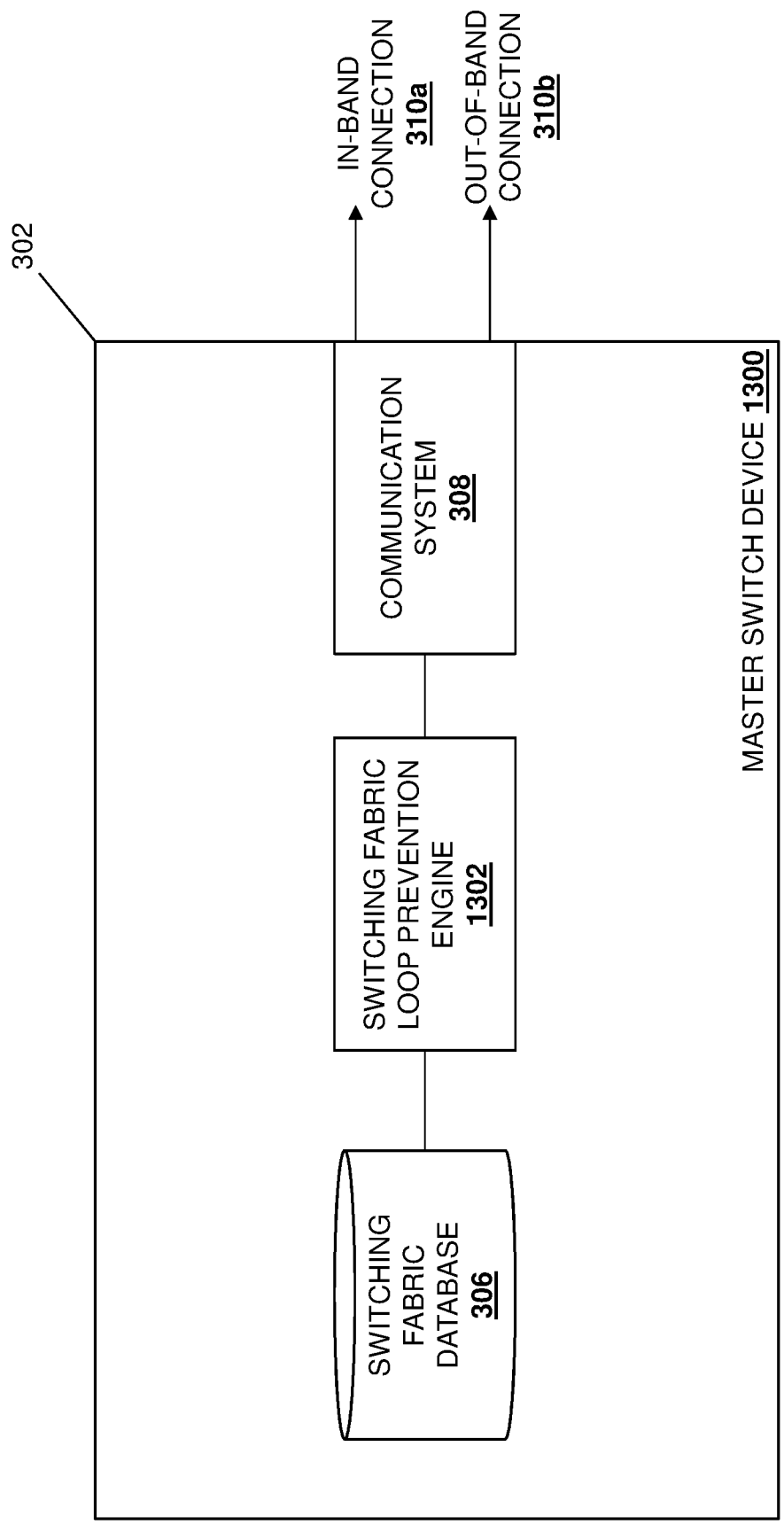
FIG. 13 is a schematic view illustrating an embodiment of the switch device of FIG. 3 that is configured to provide a master switch device in the switching fabric loop prevention system of FIG. 12.

Referring now to FIG. 13, an embodiment of a master switch device 1300 is illustrated that may provide the master switch device 1202 discussed above with reference to FIG. 12, and that includes similar components as the switch device 300 discussed above with reference to FIG. 3. As such, elements numbers for similar components in the switch device 300 and the master switch device 1300 are provided with the same reference numbers. As discussed above, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a switching fabric loop prevention engine 1302 that is configured to perform the functionality of the switching fabric loop prevention engines and/or master switch devices discussed below. In the specific example illustrated in FIG. 13, the switching fabric engine 304 in the switch device 300 has been replaced with the switching fabric loop prevention engine 1302 in the master switch device 1300 that may be provided via the configuration of the switch device 300 as a master switch device in the manner discussed above. However, while a specific master switch device has been illustrated and described, one of skill in the art in possession of the present disclosure will recognize that master switch devices may include a variety of components and/or component configurations for performing the functionality discussed below while remaining within the scope of the present disclosure.

Figure 14:
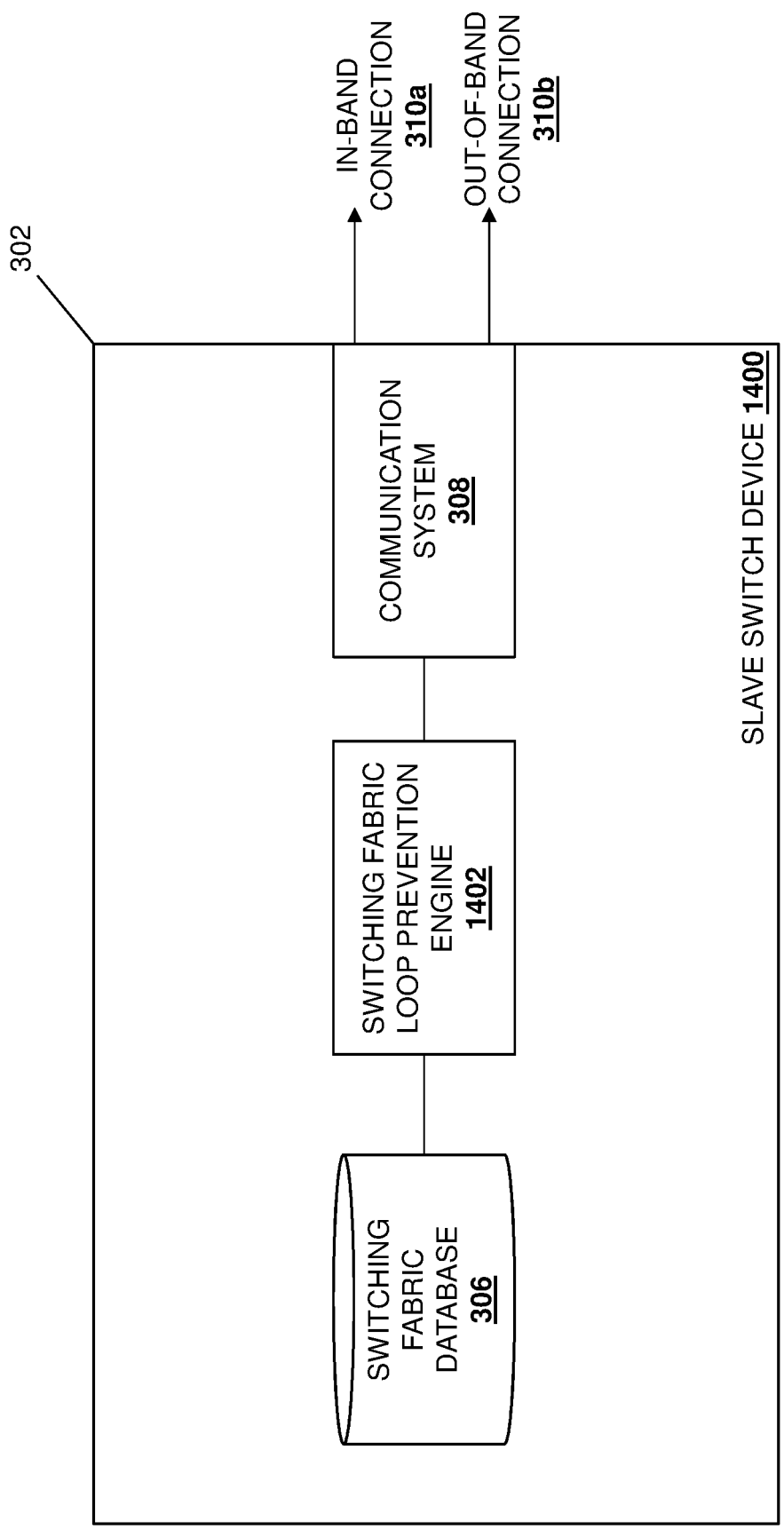
FIG. 14 is a schematic view illustrating an embodiment of the switch device of FIG. 3 that is configured to provide a slave switch device in the switching fabric loop prevention system of FIG. 12.

Referring now to FIG. 14, an embodiment of a slave switch device 1400 is illustrated that may provide any of the slave switch devices 702a-e discussed above with reference to FIG. 12, and that includes similar components as the switch device 300 discussed above with reference to FIG. 3. As such, elements numbers for similar components in the switch device 300 and the slave switch device 1400 are provided with the same reference numbers. As discussed above, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a switching fabric loop prevention engine 1402 that is configured to perform the functionality of the switching fabric loop prevention engines and/or slave switch devices discussed below. In the specific example illustrated in FIG. 14, the switching fabric engine 304 in the switch device 300 has been replaced with the switching fabric loop prevention engine 1402 in the slave switch device 1400 that may be provided via the configuration of the switch device 300 as a slave switch device in the manner discussed above. However, while a specific slave switch device has been illustrated and described, one of skill in the art in possession of the present disclosure will recognize that slave switch devices may include a variety of components and/or component configurations for performing the functionality discussed below while remaining within the scope of the present disclosure.

Figure 15:
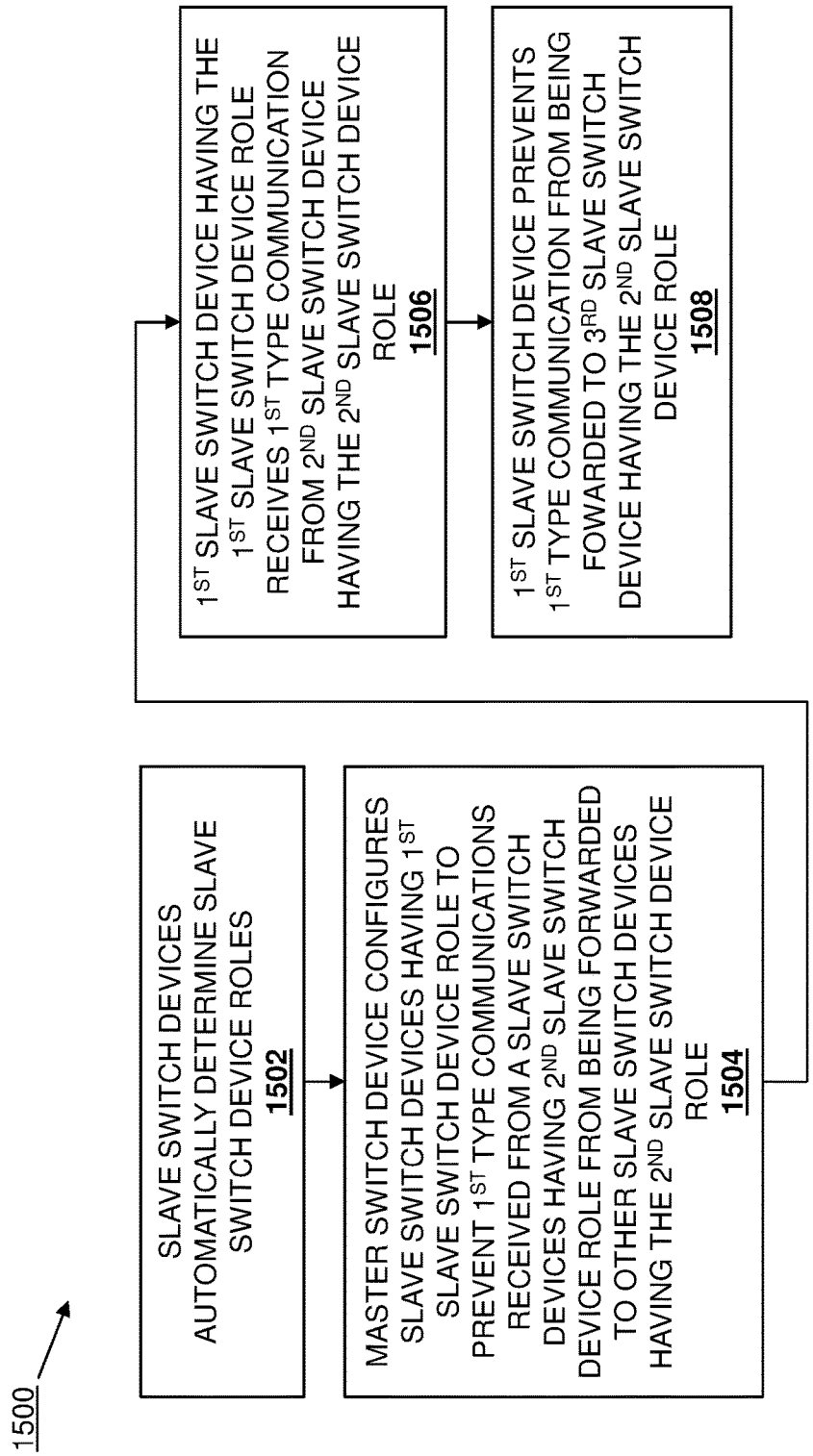
FIG. 15 is a flow chart illustrating an embodiment of a method for preventing loops in a switching fabric.

Referring now to FIG. 15, an embodiment of a method 1500 for preventing loops in a switching fabric is illustrated. As discussed below, the systems and methods of the present disclosure may provide for the prevention of loops in a switching fabric without the need to use the Spanning Tree Protocol (STP), which one of skill in the art in possession of the present disclosure will recognize operates to block ports in order to prevent loops, and thus prevents the full utilization of those ports and the switch devices that provide them. The switching fabric loop prevention of the present disclosure may be accomplished following the role assignment/determination for each of the switch devices in the switching fabric that configures some of those switch devices to operate with a first switch device role (e.g., a leaf switch device role), and configures some of those switches to operate with a second switch device role (e.g., a spine switch device role.) A master switch device in the switching fabric may then configure each of the switch devices having the first switch device role (e.g., the leaf switch devices) to prevent communications that are received from a switch device having the second switch device role (e.g., a spine switch device) from being forwarded to any other switch devices having the second switch device role (e.g., the spine switch devices). As such, when switch devices having the first switch device role (e.g., the leaf switch devices) receive communications from a switch device having the second switch device role (e.g., a spine switch device), it will prevent that communication from being forwarded to any other switch devices having the second switch device role (e.g., any other spine switch devices), thus preventing loops in the switching fabric without the need to block ports, and providing for full utilization of those ports and the switch devices that provide them.

The method 1500 begin at block 1502 where slave switch devices automatically determine their respective slave switch device roles. In an embodiment, at or prior to block 1502, each of the slave switch devices 702a-e may perform the method 900 discussed above with reference to FIG. 9, which as discussed above may have operated to configured the slave switch devices 702a and 702b with spine switch device roles such that those slave switch devices 702a and 702b operate as spine switch devices, and may have operated to configured the slave switch devices 702c-e with leaf switch device roles such that those slave switch devices 702c-e operate as leaf switch devices. However, while the automatic determination of switching fabric roles according to the teachings of the present disclosure has been described, one of skill in the art in possession of the present disclosure will recognize that block 1502 of the method 1500 may be replaced with a block that provides for switch device role assignment using other techniques while remaining within the scope of the present disclosure as well.

The method 1500 then proceeds to block 1504 where a master switch device configures slave switch devices having a first slave switch device role to prevent first type communications that are received from a slave switch device having a second slave switch device role from being forwarded to other slave switch devices having the second slave switch device role. In an embodiment, at block 1504, the switching fabric loop prevention engine 1302 in the master switch device 1202/1300 may operate to generate and/or send a loop prevention configuration via its communication system 308 to each of the slave switch devices 702c, 702d, and 702e having the first switch device role (e.g., the leaf switch devices). Thus, at block 1504, the switching fabric loop prevention engine 1402 in each of the slave switch devices 702c-e/1400 receives a loop prevention configuration via its communication system 308, and may store that loop prevention configuration in its switching fabric database 306.

For example, the loop prevention configuration sent by the master switch device 1202/1300 at block 1504 may include an Access Control List (ACL) that provides for the prevention of the forwarding of communications that are received from a slave switch device having a second slave switch device role (e.g., a spine switch device) to other slave switch devices having the second slave switch device role (e.g., spine switch devices). As would be understood by one of skill in the art in possession of the present disclosure, ACLs may include a list of permissions attached to an object, and may specify systems processes that are granted access to such objects, as well as operations that are allowed on given objects. As such, an ACL used to provide the loop prevention configuration of the present disclosure may define communications received from a spine switch device as an object, and specify the forwarding of communications to other spine switch devices as the system process that is not granted to that object, or as the operation that is not allowed on that object. Thus, the switching fabric loop prevention engine 1402 in each of the slave switch devices 702c-e/1400 may perform a variety of operations for implementing the ACL that provides the loop prevention configuration. However, while the use of ACLs for the loop prevention configuration of the present disclosure have been described, one of skill in the art in possession of the present disclosure will recognize that the loop prevention configurations of the present disclosure may be provided in a variety of manners that will fall within its scope as well.

Figure 16A:
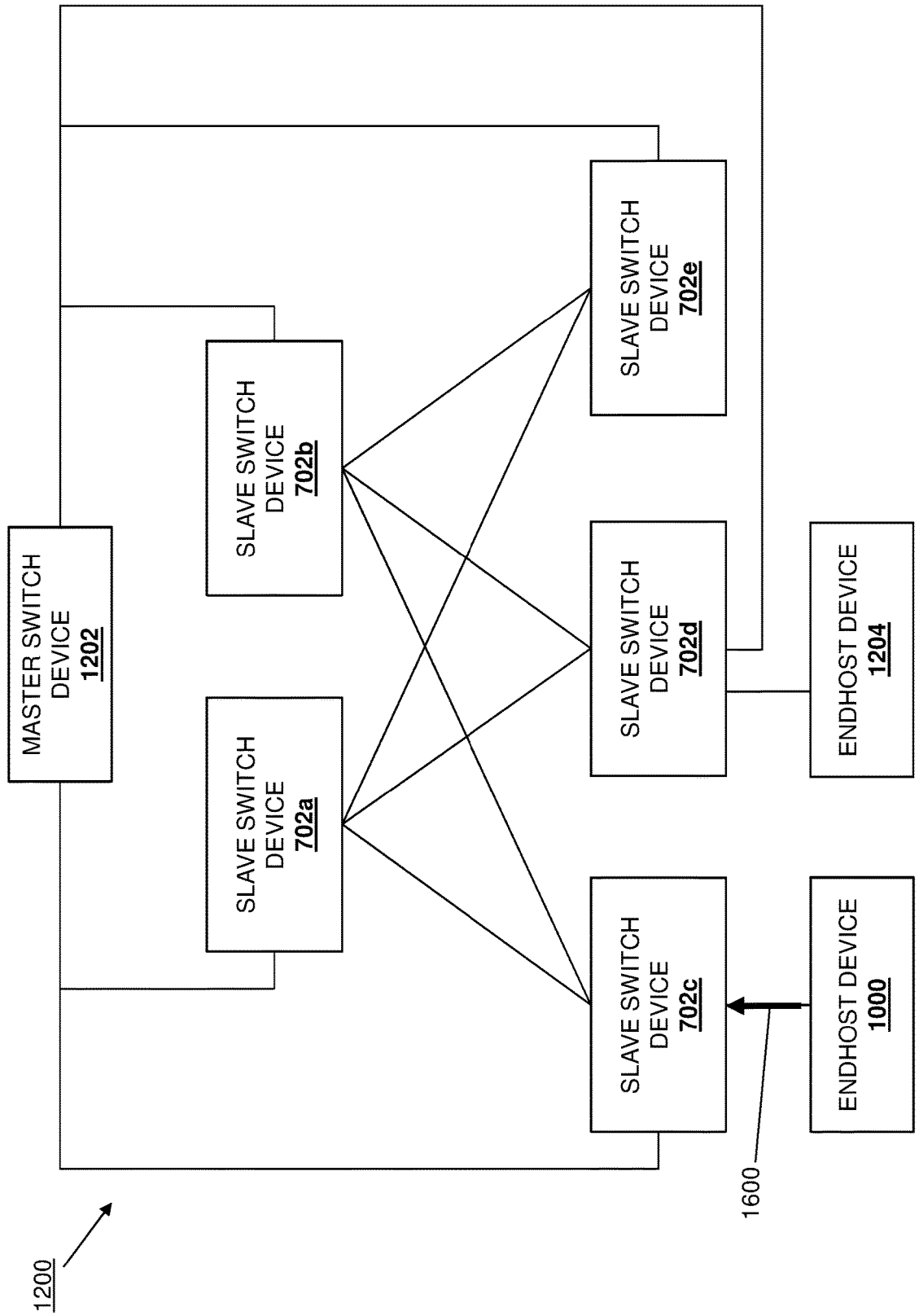
FIG. 16A is a schematic view illustrating an embodiment of a communication transmitted in the switching fabric loop prevention system of FIG. 12 during the method of FIG. 15.

The method 1500 then proceeds to block 1506 where a first slave switch device receives a first type communication from a second slave switch device having the second slave switch device role. In an embodiment, at block 1506 and following the configuration of the slave switch devices 702c-e in the switching fabric at block 1504, the slave switch device 702d (the first slave switch device in this example) in the switching fabric may receive a first type communication from a slave switch device 702a (the second slave switch device in this example). For example, with reference to FIG. 16A, the endhost device 1000 may generate and send a first type communication 1600 to the slave switch device 702c.

Figure 16B:
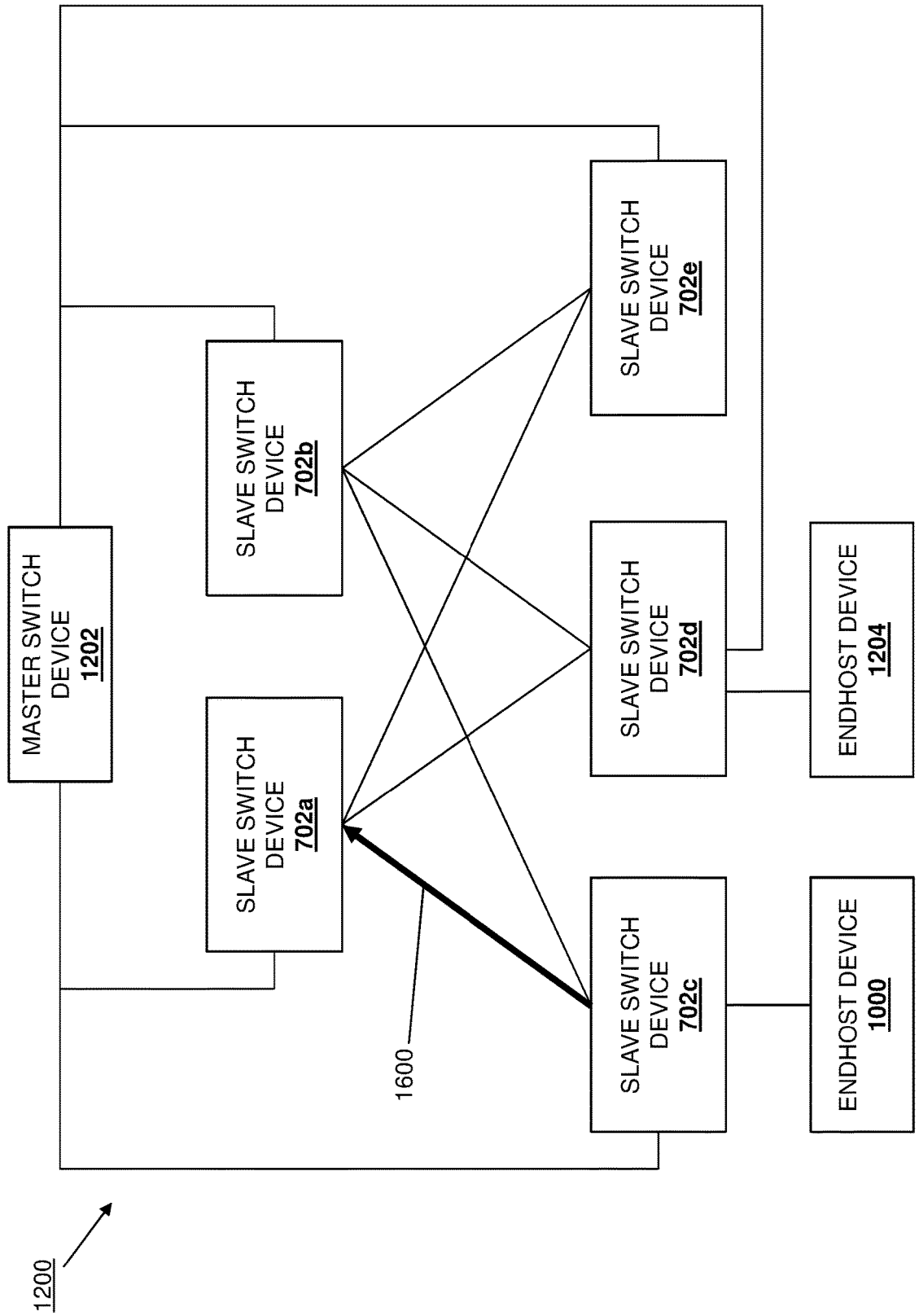
FIG. 16B is a schematic view illustrating an embodiment of a communication forwarded in the switching fabric loop prevention system of FIG. 12 during the method of FIG. 15.

In some embodiments, switch devices operating as leaf switch devices may learn source MAC address for devices that provide data packets via its appliance-facing ports (e.g., the endhost device 1000), and may forward Broadcast, Unknown unicast, and Multicast (BUM) data traffic on ports connected to switch devices operating as spine switch devices based on, for example, the hardware ACL rules described herein. For example, with reference to FIG. 16B, the slave switch device 702c may learn the source MAC address of the endhost device 1000, and then forward the first type communication 1600 to the slave switch device 702a based on, or example, a round robin algorithm that selects a port connected to the slave switch device 702a operating as a spine switch device for forwarding the first type communication 1600 (rather than a port connected to the slave switch device 702b operating as a spine switch device). As such, BUM data traffic rules in each switch device operating as a leaf switch device may be programmed in hardware as an algorithm that forwards BUM data traffic (e.g., Address Resolution Protocol (ARP) data traffic) received on an appliance-facing port (e.g., the port connected to the endhost device 1000) to a switch device operating as a spine switch device via a round robin algorithm that associates appliance-facing port(s) and spine switch device(s) (which may be based on a list of "best" spine switch devices selected from switch devices that have the most connections to leaf switch devices.)

Figure 16C:
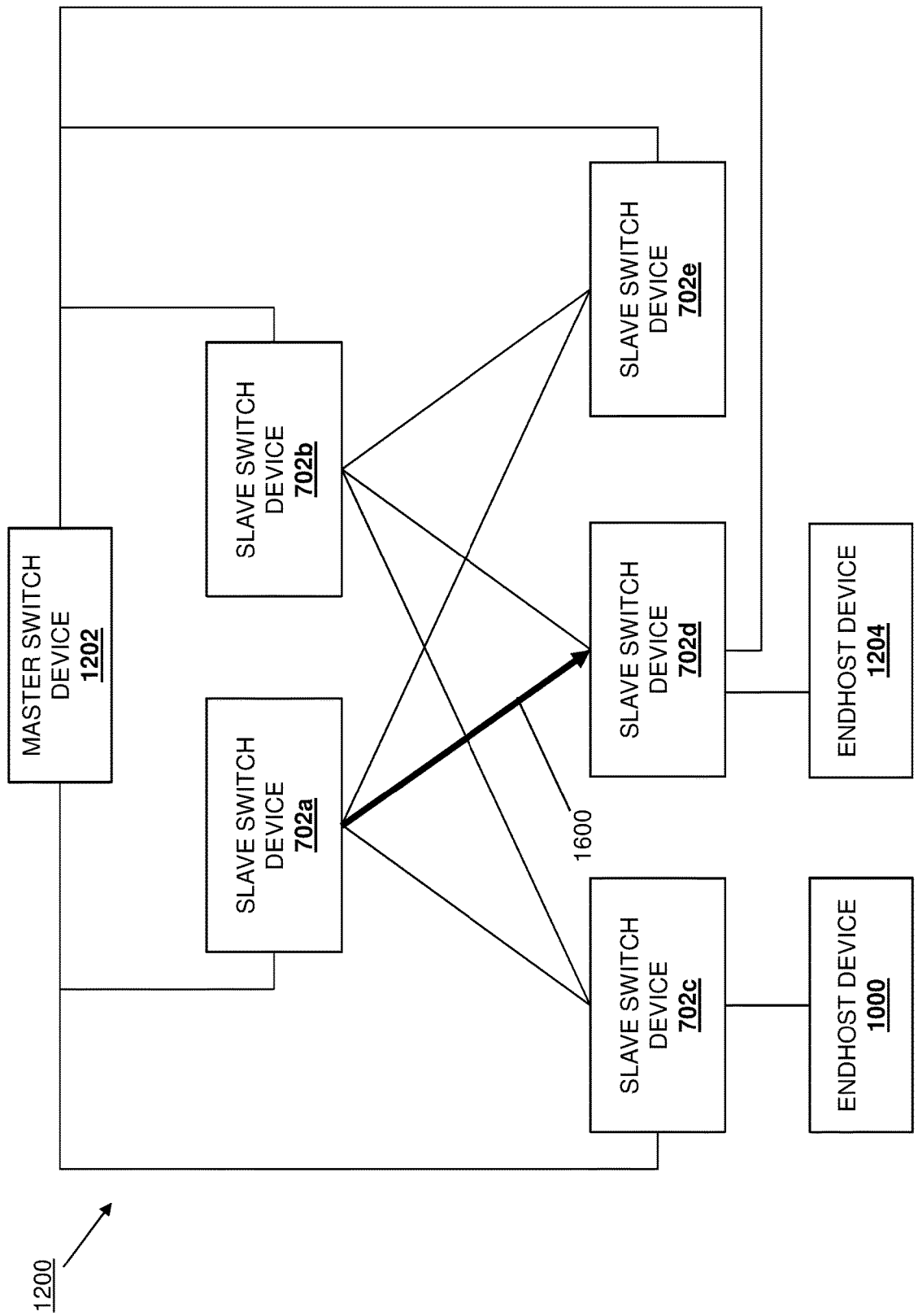
FIG. 16C is a schematic view illustrating an embodiment of a communication forwarded in the switching fabric loop prevention system of FIG. 12 during the method of FIG. 15.

With reference to FIG. 16C, the slave switch device 702a will then forward the first type communication 1600 to the slave switch device 702d (e.g., using layer 2 forwarding techniques). As such, as block 1506, the slave switch device 702d (the first slave switch device in this example) in the switching fabric receives the first type communication 1600 from the slave switch device 702a (the second slave switch device in this example). In a specific example, on switch devices operating as spine switch devices, the receiving of an initial data packet from a source endhost device may cause the source MAC address of the source endhost device to be learned, and then that data packet may be flooded to each switch device operating as a leaf switch device. On each switch device operating as a leaf switch device, packets may then be forwarded via all appliance-facing ports, and the destination endhost device(s) connected to those appliance-facing ports will respond. Subsequent unicast responses (e.g., ARP responses) from the destination endhost device may then be forwarded to a designated spine switch device, and that spine switch device will forward that response to the leaf switch device on which the source MAC address of the source endhost device was previously learned. Such load balancing algorithms may attempt to distribute endhost device traffic evenly onto spine switch devices to prevent congestion, while providing deterministic designation of spine switch devices through which endhost device traffic is traversing.

Figure 16D:
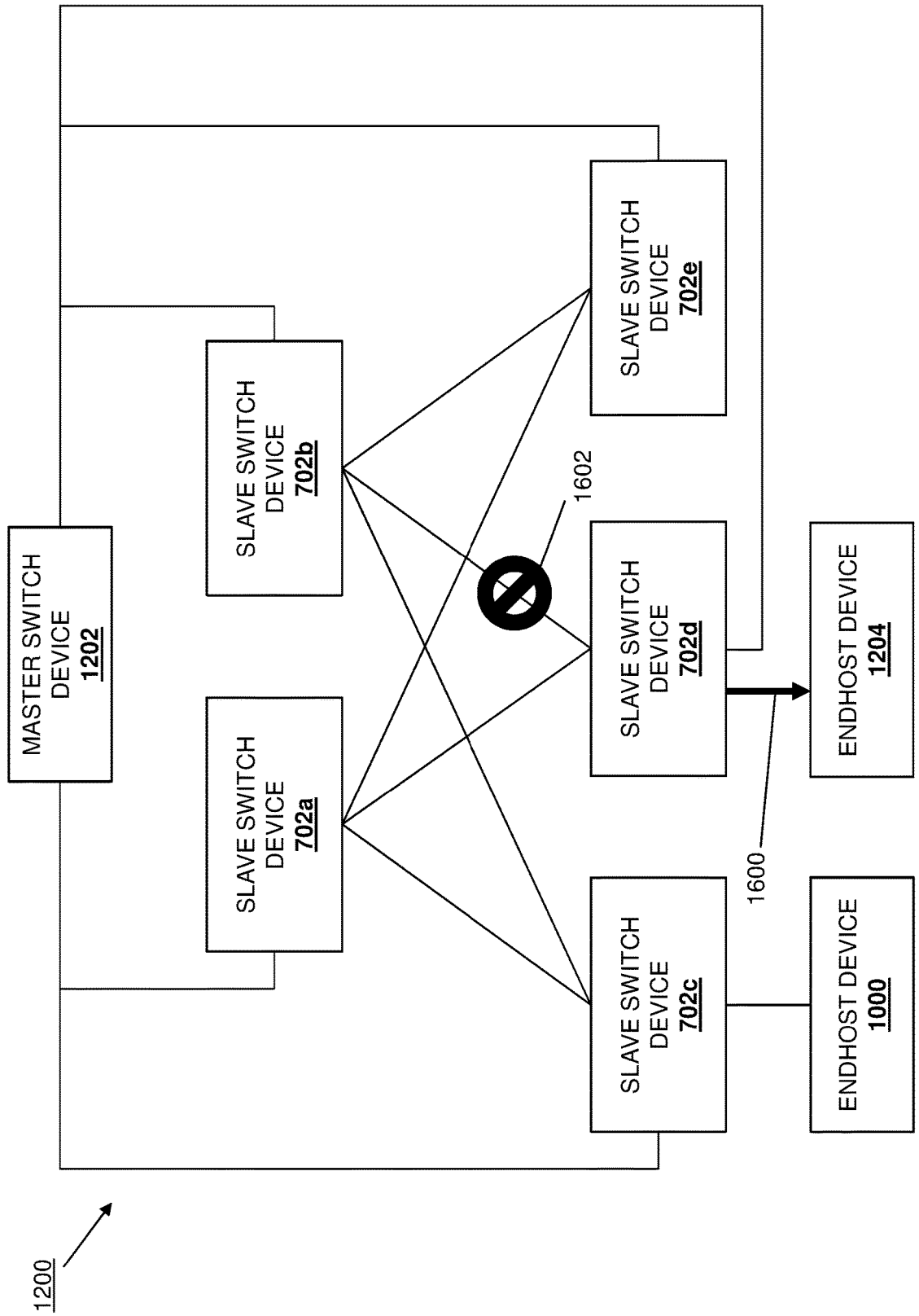
FIG. 16D is a schematic view illustrating an embodiment of a communication being prevented in the switching fabric loop prevention system of FIG. 12 during the method of FIG. 15.

The method 1500 then proceeds to block 1508 where the first slave switch device prevents the first type communication from being forwarded to a third slave switch device having the second slave switch device role. In an embodiment, at block 1508 and upon receiving the first type communication 1600 from the slave switch device 702*a* via its communication system 308, the switching fabric loop prevention engine 1402 in the slave switch device 702*d*/1400 will operate according to the loop prevention configuration it was provided at block 1504 in order to prevent the first type communication from being forwarded to the slave switch device 702*b*, as illustrated by element 1602 in FIG. 16D. Continuing with the example discussed above, at block 1508 and upon receiving the first type communication 1600 from the slave switch device 702*a* via its communication system 308, the switching fabric loop prevention engine 1402 in the slave switch device 702*d*/1400 will access the ACL provided in the loop prevention configuration at block 1504, determine that the first type communication was received from the slave switch device 702*a* with the spine switch device role that causes it to operate as a spine switch device, and determine that the ACL prevents the first type communication received from a spine switch device from being forwarded to other spine switch devices. The switching fabric loop prevention engine 1402 in the slave switch device 702*d*/1400 may then determine that the slave switch device 702*b* with the spine switch device role that causes it to operate as a spine switch device is directly connected to its communication system 308, and will prevent the forwarding of the first type communication 1600 to that slave switch device 702*b* (as illustrate by element 1602.) Furthermore, as illustrated in FIG. 16D and as will be appreciated by one of skill in the art in possession of the present disclosure, the switching fabric loop prevention engine 1402 in the slave switch device 702*d*/1400 may forward the first type communication 1600 through its communication system 308 to the endhost device 1204.

Thus, systems and methods have been described that provide a "flat" layer 2 (L2) forwarding plane that allows for the scale-out of a multi-element network directly using L2 forwarding lookups, and without the need to utilize complex routed L2 approaches or proprietary L2 forwarding. In some examples, this may be accomplished following the role assignment/determination for each of the switch devices in the switching fabric that configures some of those switch devices to operate with a first switch device role (e.g., a leaf switch device role), and configures some of those switches to operate with a second switch device role (e.g., a spine switch device role.) A master switch device in the switching fabric may then configure each of the switch devices having the first switch device role (e.g., the leaf switch devices) to prevent communications that are received from a switch device having the second switch device role (e.g., a spine switch device) from being forwarded to any other switch devices having the second switch device role (e.g., the spine switch devices). As such, when the switch devices having the first switch device role (e.g., the leaf switch devices) receive communications from a switch device having the second switch device role (e.g., a spine switch device), it will prevent that communication from being forwarded to any other switch devices having the second switch device role (e.g., any other spine switch devices), thus preventing loops in the switching fabric without the need to block ports, and while providing for full utilization of those ports and the switch devices that provide them.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A switching fabric loop prevention system, comprising:
    a plurality of first slave switch devices that are each included in a switching fabric and that are each configured to:
        automatically determine a first slave switch device role for that first slave switch device based on first directly connected device identification information received from a first directly connected device;
    a plurality of second slave switch devices that are each included in the switching fabric and that are each configured to:
        automatically determine a second slave switch device role for that second slave switch device based on second directly connected device identification information received from a second directly connected device; and
    a master switch device that is included in the switching fabric and that is configured to:
        configure each of the plurality of first slave switch devices having the first slave switch device role to prevent first type communications that have been received from one of the plurality of second slave switch devices having the second slave switch device role from being forwarded to another of the plurality of second slave switch devices having the second slave switch device role.

2. The system of claim 1, wherein the first slave switch device role is a leaf switch device role.

3. The system of claim 1, wherein the second slave switch device role is a spine switch device role.

4. The system of claim 1, wherein the configuring the plurality of first slave switch devices having the first slave switch device role to prevent the first type communications that have been received from one of the plurality of second slave switch devices having the second slave switch device role from being forwarded to another of the plurality of second slave switch devices having the second slave switch device role includes the master switch device:
    providing, on each of the plurality of first slave switch devices having the first slave switch device role, at least one Access Control List (ACL) that prevents the first type communications that have been received from one of the plurality of second slave switch devices having the second slave switch device role from being forwarded to another of the plurality of second slave switch devices having the second slave switch device role.

5. The system of claim 1, wherein each of the plurality of first slave switch devices is configured to:
    load balance data traffic to the plurality of second slave switch devices.

6. The system of claim 5, wherein the data traffic includes Broadcast, unknown Unicast, and Multicast (BUM) data traffic.

7. An Information Handling System (IHS), comprising:
    a processing system; and
    a memory system that is coupled to the processing system and that includes instructions that, when executed by the processing system, cause the processing system to provide a switching fabric loop prevention engine that is configured to:
        receive, from a directly connected device, directly connected device identification information;

automatically determine, based on the directly connected device identification information received from the directly connected device, a first slave switch device role for the IHS;

receive, from a master switch device, a first loop prevention configuration that configures the switching fabric loop prevention engine to prevent first type communications that have been received from one of a plurality of second slave switch devices having a second slave switch device role from being forwarded to another of the plurality of second slave switch devices having the second slave switch device role;

receive, from one of the plurality of second slave switch devices having a second slave switch device role, a first type communication; and prevent the first type communication from being forwarded to another of the plurality of second slave switch devices having the second slave switch device role.

8. The IHS of claim 7, wherein the first slave switch device role is a leaf switch device role.

9. The IHS of claim 7, wherein the second slave switch device role is a spine switch device role.

10. The IHS of claim 7, wherein the receiving the first loop prevention configuration that configures the switching fabric loop prevention engine to prevent first type communications that have been received from one of the plurality of second slave switch devices having the second slave switch device role from being forwarded to another of the plurality of second slave switch devices having the second slave switch device role includes:

receiving, from the master switch, at least one Access Control List (ACL) that prevents the first type communications that have been received from one of the plurality of second slave switch devices having the second slave switch device role from being forwarded to another of the plurality of second slave switch devices having the second slave switch device role.

11. The IHS of claim 7, wherein the switching fabric loop prevention engine is configured to:

load balance data traffic to the plurality of second slave switch devices.

12. The IHS of claim 11, wherein the data traffic includes Broadcast, unknown Unicast, and Multicast (BUM) data traffic.

13. The IHS of claim 11, wherein the switching fabric loop prevention engine is configured to:

learn, from the data traffic, an address of the directly connected device.

14. A method for preventing loops in a switching fabric, comprising:

receiving, by a first slave switch device from a directly connected device, directly connected device identification information;

automatically determining, by the first slave switch device based on the directly connected device identification information received from the directly connected device, a first slave switch device role for the first slave switch device;

receiving, by the first slave switch device from a master switch device, a first loop prevention configuration that configures the first slave switch device to prevent first type communications that have been received from one of a plurality of second slave switch devices having a second slave switch device role from being forwarded to another of the plurality of second slave switch devices having the second slave switch device role;

receiving, by the first slave switch device from one of the plurality of second slave switch devices having a second slave switch device role, a first type communication; and preventing, by the first slave switch device, the first type communication from being forwarded to another of the plurality of second slave switch devices having the second slave switch device role.

15. The method of claim 14, wherein the first slave switch device role is a leaf switch device role.

16. The method of claim 14, wherein the second slave switch device role is a spine switch device role.

17. The method of claim 14, wherein the receiving the first loop prevention configuration that configures the switching fabric loop prevention engine to prevent first type communications that have been received from one of the plurality of second slave switch devices having the second slave switch device role from being forwarded to another of the plurality of second slave switch devices having the second slave switch device role includes:

receiving, by the first slave switch device from the master switch, at least one Access Control List (ACL) that prevents the first type communications that have been received from one of the plurality of second slave switch devices having the second slave switch device role from being forwarded to another of the plurality of second slave switch devices having the second slave switch device role.

18. The method of claim 14, further comprising:

load balancing, by the first slave switch device, data traffic to the plurality of second slave switch devices.

19. The method of claim 18, wherein the data traffic includes Broadcast, unknown Unicast, and Multicast (BUM) data traffic.

20. The method of claim 18, further comprising:

learning, by the first slave switch device from the data traffic, an address of the directly connected device.

* * * * *